United States Patent
Kim et al.

(10) Patent No.: US 12,470,987 B2
(45) Date of Patent: Nov. 11, 2025

(54) N14 INTERFACE SUPPORT INDICATOR FOR SERVICE CONTINUITY

(71) Applicant: LG ELECTRONICS INC, Seoul (KR)

(72) Inventors: Seokjung Kim, Seoul (KR); Myungjune Youn, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 463 days.

(21) Appl. No.: 17/913,390

(22) PCT Filed: Mar. 23, 2021

(86) PCT No.: PCT/KR2021/003566
§ 371 (c)(1),
(2) Date: Sep. 21, 2022

(87) PCT Pub. No.: WO2021/194214
PCT Pub. Date: Sep. 30, 2021

(65) Prior Publication Data
US 2023/0136425 A1  May 4, 2023

(30) Foreign Application Priority Data

Mar. 27, 2020 (KR) .................. 10-2020-0037699
Apr. 3, 2020 (KR) .................. 10-2020-0041057
Sep. 29, 2020 (KR) .................. 10-2020-0127359

(51) Int. Cl.
*H04W 36/00* (2009.01)
*H04W 36/14* (2009.01)
(Continued)

(52) U.S. Cl.
CPC ... *H04W 36/0066* (2013.01); *H04W 36/0022* (2013.01); *H04W 36/00698* (2023.05);
(Continued)

(58) Field of Classification Search
CPC ....... H04W 36/0066; H04W 36/00698; H04W 36/38; H04W 60/04; H04W 72/56
See application file for complete search history.

(56) References Cited

U.S. PATENT DOCUMENTS

2019/0174449 A1* 6/2019 Shan ............... H04W 60/04
2019/0182718 A1* 6/2019 Shan ............... H04W 76/16
(Continued)

FOREIGN PATENT DOCUMENTS

CN  109661006 A  4/2019
KR  20200004371 A  1/2020

OTHER PUBLICATIONS

S2-1912778, 3GPP SA WG2 Meeting #136, Reno, Nevada Nov. 18-22, 2019, (e-mail revision 4 of S2-1912719), Source: Intel, Title: Solution for Non-public network supporting service providers, Agenda Item: 8.3, Work Item/Release FS_eNPN / Rel-17, (4 pages).
(Continued)

*Primary Examiner* — Donald L Mills
(74) *Attorney, Agent, or Firm* — BRYAN CAVE LEIGHTON PAISNER LLP

(57) ABSTRACT

Provided is a method and device for an N14 interface support indicator for service continuity. A next generation radio access network (NG-RAN) node of a first network receives an initial UE context configuration request message from an access and mobility management function (AMF) of the first network. The initial UE context configuration request message includes (i) a registration acceptance message that is a response to a registration request message, and (ii) information on at least one second network supported by the first network, and the registration acceptance message includes information on whether an N14 interface between the AMF of the first network and an AMF of the at least one second network is supported. The NG-RAN node of the first
(Continued)

network initiates handover to one network among the at least one second network, based on the information on the at least one second network.

5 Claims, 21 Drawing Sheets

(51) Int. Cl.
    *H04W 36/38* (2009.01)
    *H04W 60/04* (2009.01)
    *H04W 72/56* (2023.01)

(52) U.S. Cl.
    CPC ....... *H04W 36/1443* (2023.05); *H04W 36/38* (2013.01); *H04W 60/04* (2013.01); *H04W 72/56* (2023.01)

(56) References Cited

U.S. PATENT DOCUMENTS

| | | | |
|---|---|---|---|
| 2019/0254094 A1* | 8/2019 | Babu | H04W 76/15 |
| 2019/0281522 A1 | 9/2019 | Wong et al. | |
| 2020/0245235 A1 | 7/2020 | Chun | |
| 2022/0103987 A1* | 3/2022 | Shan | H04W 4/40 |

OTHER PUBLICATIONS

S2-2001067, SA WG2 Meeting #S2-136-AH, Jan. 13-17, 2020, Incheon, Korea, (revision of S2-2000700), Title: Clarification on the use of reference points N14 and N26, Source to WG: Telecom Italia, Deutsche Telekom, Soutce to TSG: SA2, Date: Jan. 2, 2020, Category F, Release: Rel-16, (7 pages).

S2-2001527, 3GPP TSG-SA WG2 Meeting #136-AH, Incheon, Korea (Republic of), Jan. 13, 2020-Jan. 17, 2020, Source: Qualcomm Incorporated, Sennheiser, Title: Solution for SNPN access using 3rd party credentials, Agenda Item: 8.3, Work Item / Release: FS_eNPN / Rel-17 (6 pages).

S2-2005927, 3GPP TSG-WG SA2 Meeting #140E e-meeting, Elbonia, Aug. 19-Sep. 1, 2020, (revision of S2-2005621), Source: Huawei, HiSilicon, Nokia, Nokia Shanghai Bell, Title: KI #1, New Sol: update to specify the support of roaming-based or N3IWF-based architecture for mobility scenarios, Agenda Item: 8.2 (4 pages).

3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16) (401 pages).

3GPP TS 23.502 V16.3.0 (Dec. 2019), Technical Specification, 3rd Generation Partnership Project; Technical Specification Group Services and System Aspects; Procedures for the 5G System (5GS); Stage 2 (Release 16) (560 pages).

* cited by examiner

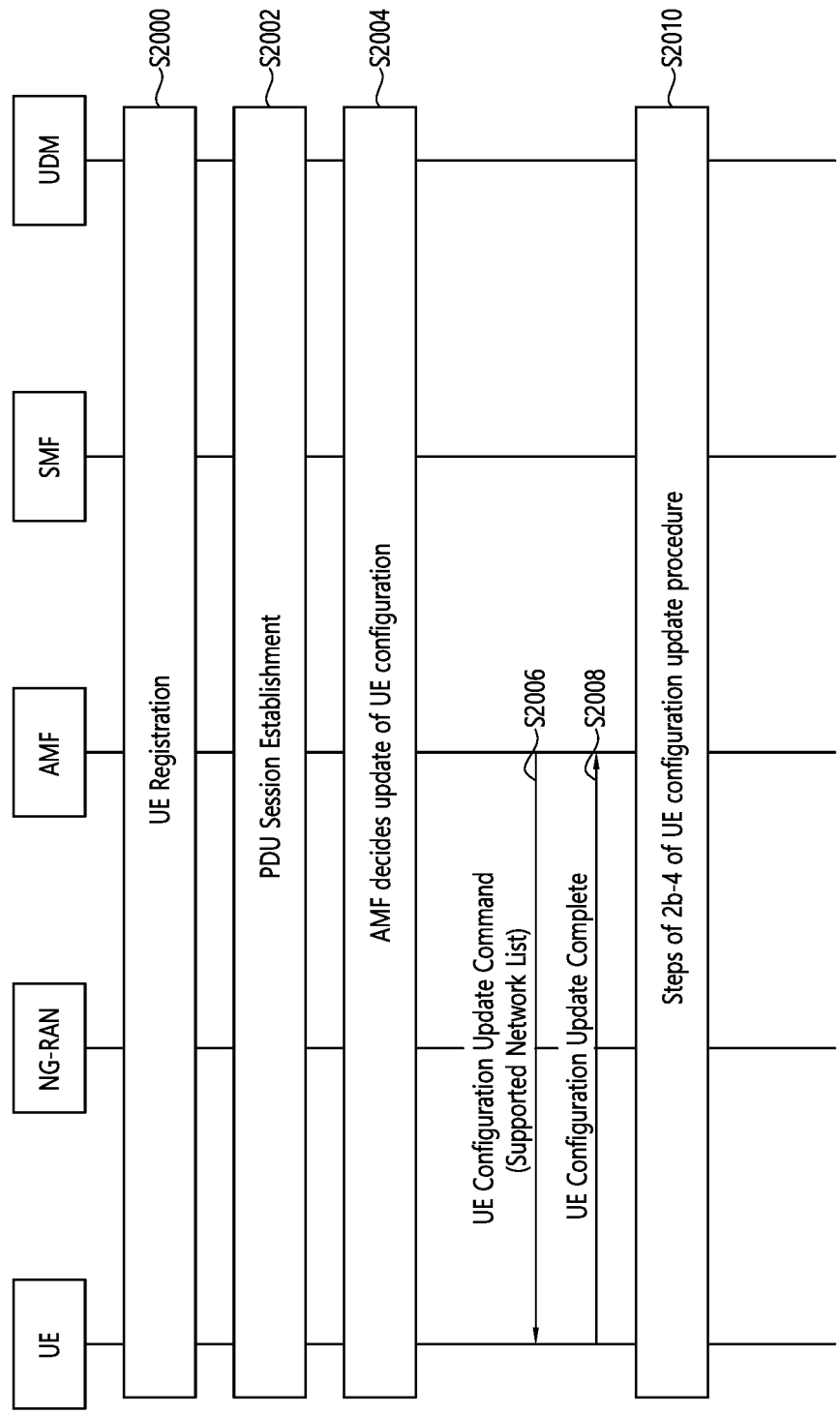

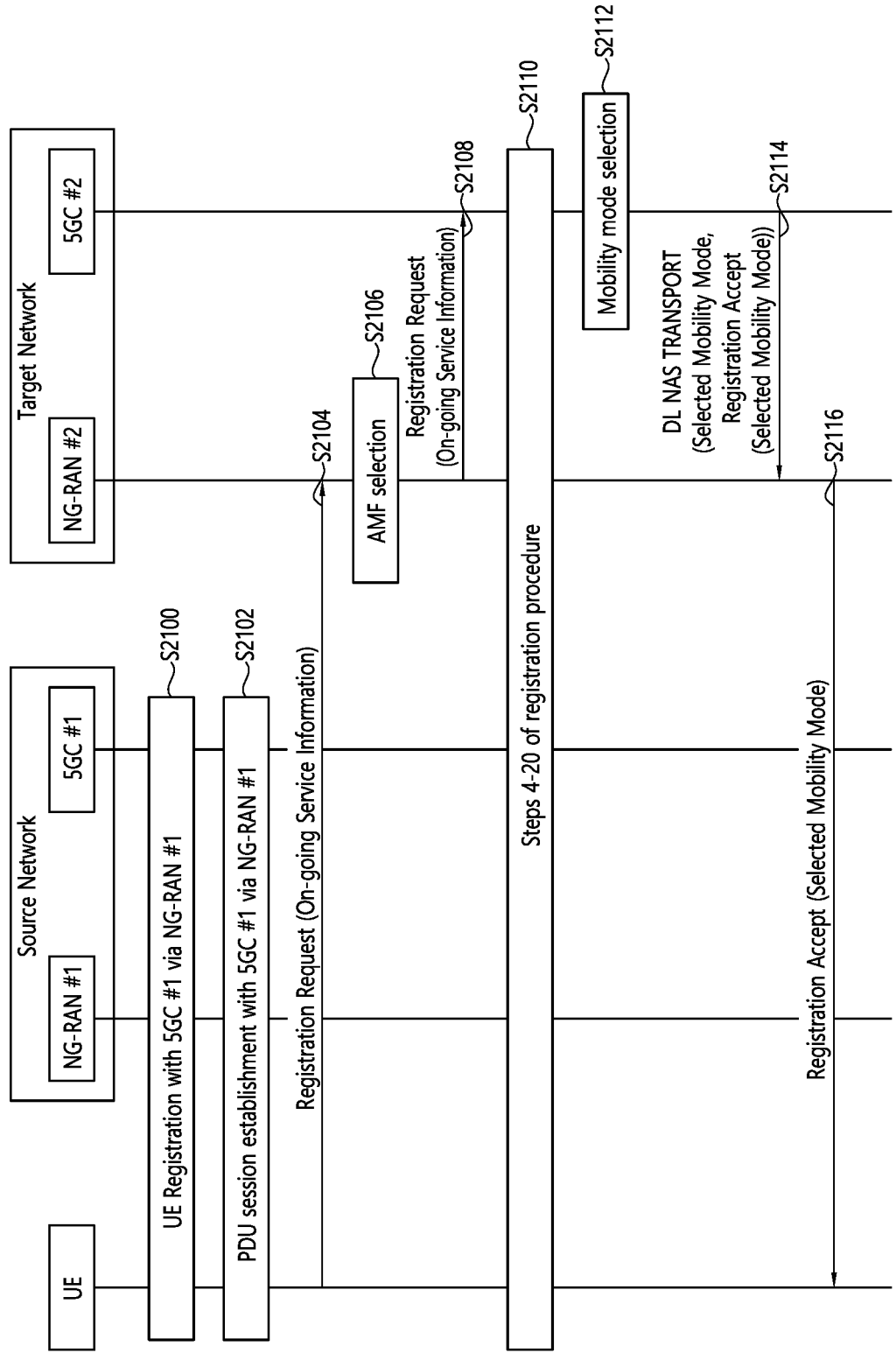

N14 INTERFACE SUPPORT INDICATOR FOR SERVICE CONTINUITY

CROSS-REFERENCE TO RELATED APPLICATIONS

This application is a National Stage Filing Under 35 U.S.C. 371 of International Application No. PCT/KR2021/003566, filed on Mar. 23, 2021, which claims the benefit of earlier filing date and right of priority to Korean Application No. 10-2020-0037699, filed on Mar. 27, 2020, Korean Application No. 10-2020-0041057, filed on Apr. 3, 2020, Korean Application No. 10-2020-0127359, filed on Sep. 29, 2020, the contents of which are all hereby incorporated by reference herein in their entirety.

TECHNICAL FIELD

The present disclosure relates to N14 interface support indicator for service continuity.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Non-public networks (NPN) are intended for the sole use of a private entity such as an enterprise, and may be deployed in a variety of configurations, utilizing both virtual and physical elements. Specifically, they may be deployed as completely standalone networks, they may be hosted by a public land mobile network (PLMN), or they may be offered as a slice of a PLMN.

In any of these deployment options, it is expected that unauthorized user equipments (UEs), those that are not associated with the enterprise, will not attempt to access the non-public network, which could result in resources being used to reject that UE and thereby not be available for the UEs of the enterprise. It is also expected that UEs of the enterprise will not attempt to access a network they are not authorized to access. For example, some enterprise UEs may be restricted to only access the non-public network of the enterprise, even if PLMN coverage is available in the same geographic area. Other enterprise UEs may be able to access both a non-public network and a PLMN where specifically allowed.

SUMMARY

A method in which the network guarantees service continuity to other networks according to the network configuration situation and at the same time does not cause unnecessary delay time to the user equipment may be required.

In an aspect, a method performed by a Next Generation Radio Access network (NG-RAN) node of a first network operating in a wireless communication system is provided. The method comprises receiving an initial UE Context Setup Request message from an Access and Mobility Management Function (AMF) of the first network. The initial UE Context Setup Request message includes (i) a Registration Accept message which is a response to a Registration Request message, and (ii) information about at least one second network supported by the first network, and the Registration Accept message includes information about whether an N14 interface between the AMF of the first network and an AMF of the at least one second network is supported. The method comprises, based on the information about the at least one second network, initiating a handover for a UE to one of the at least one second network.

In another aspect, an apparatus for implementing the above method is provided.

The present disclosure may have various advantageous effects.

For example, when triggering handover to the target network, the NG-RAN of the source network may reduce unnecessary handover attempts by referring to the existence of the N14 interface.

For example, when the UE moves to the target network in which the N14 interface does not exist, the UE can quickly execute a subsequent operation based on information provided from the source network, thereby guaranteeing service continuity to the user.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 20 shows an example of a method for informing a UE of whether handover between a PLMN and an SNPN is possible through a UE configuration update procedure after a PDU session establishment procedure to which implementations of the present disclosure is applied.

FIG. 21 shows an example of a method in which a target network notifies a UE of whether handover between a PLMN and an SNPN is possible to which implementations of the present disclosure is applied.

DETAILED DESCRIPTION

Figure 1:
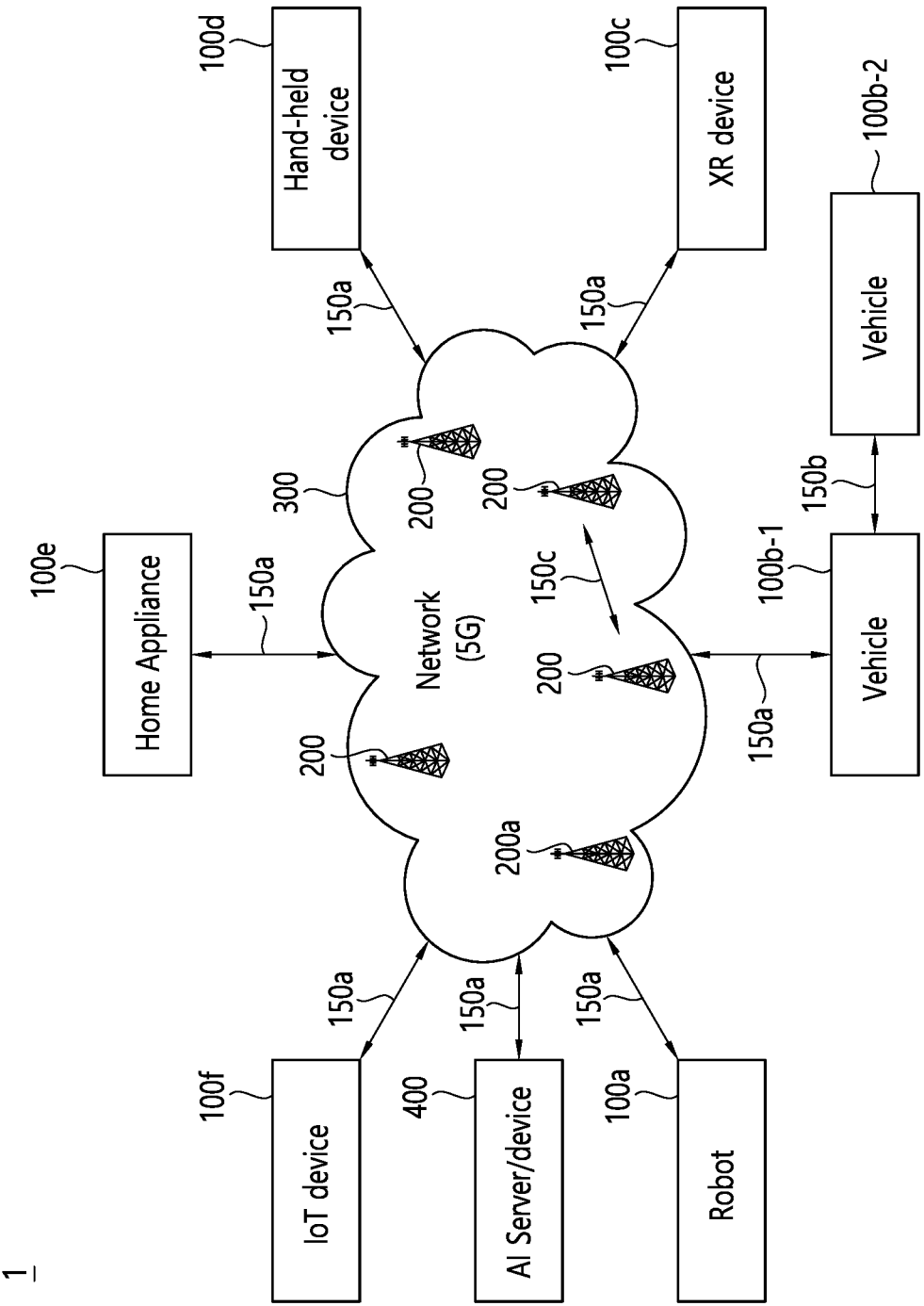
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world.

The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
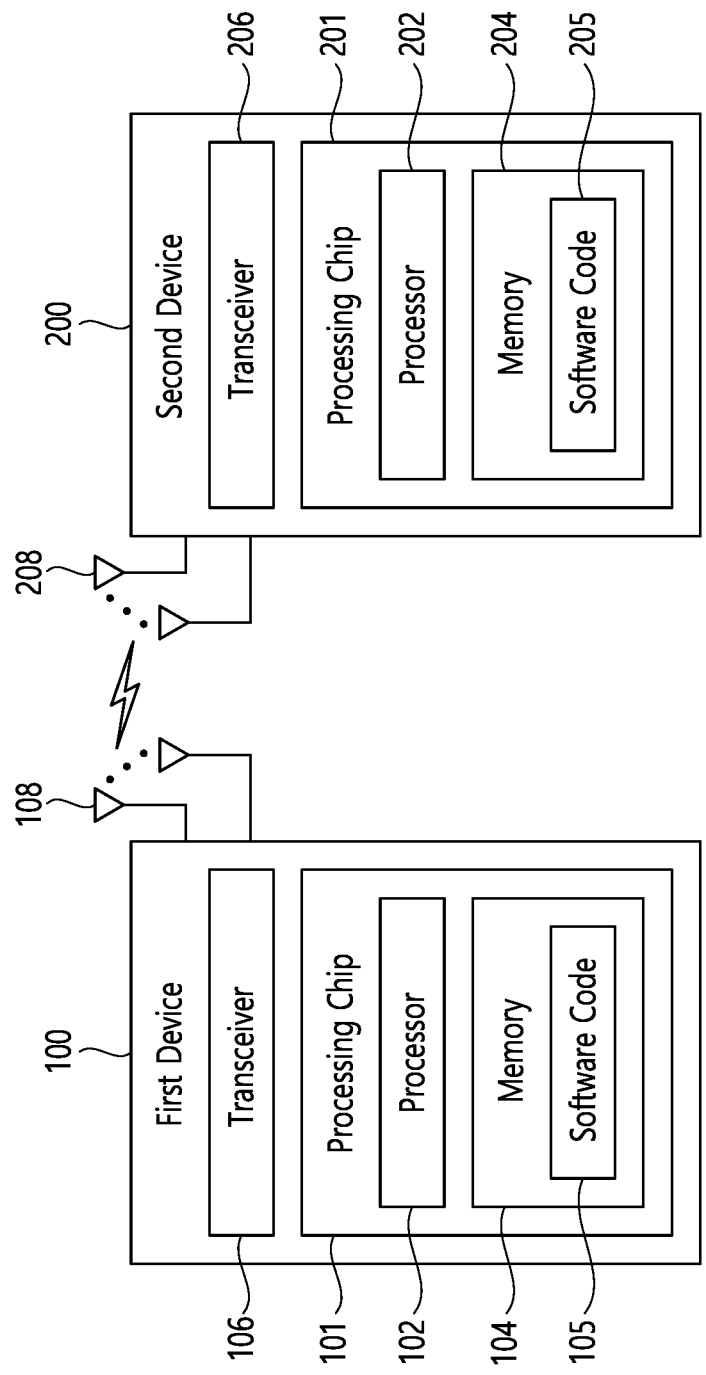
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be adapted to include the modules, procedures, or functions. Firmware or software adapted to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
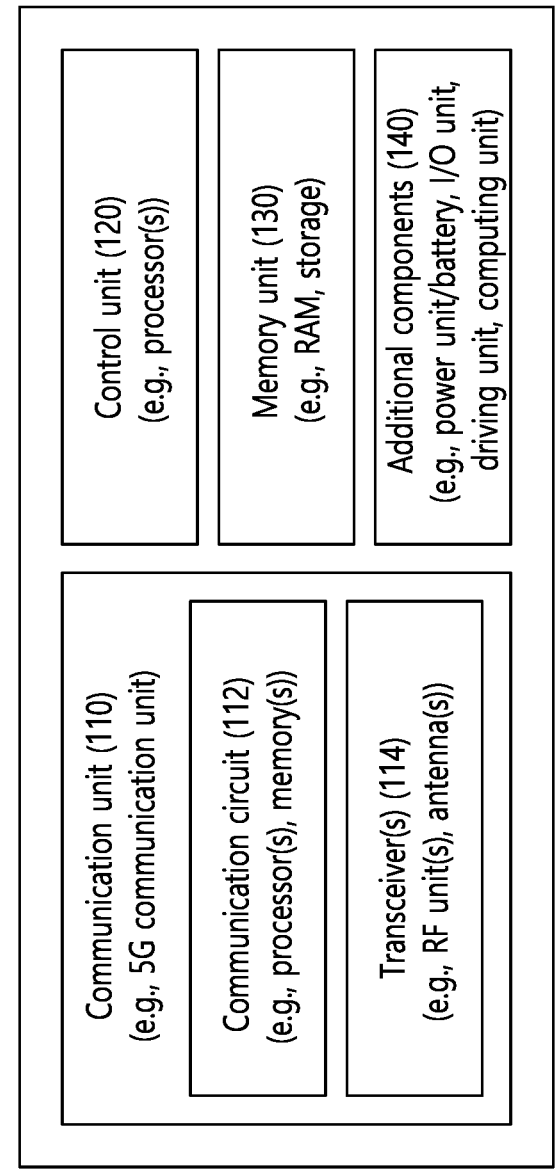
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/ mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
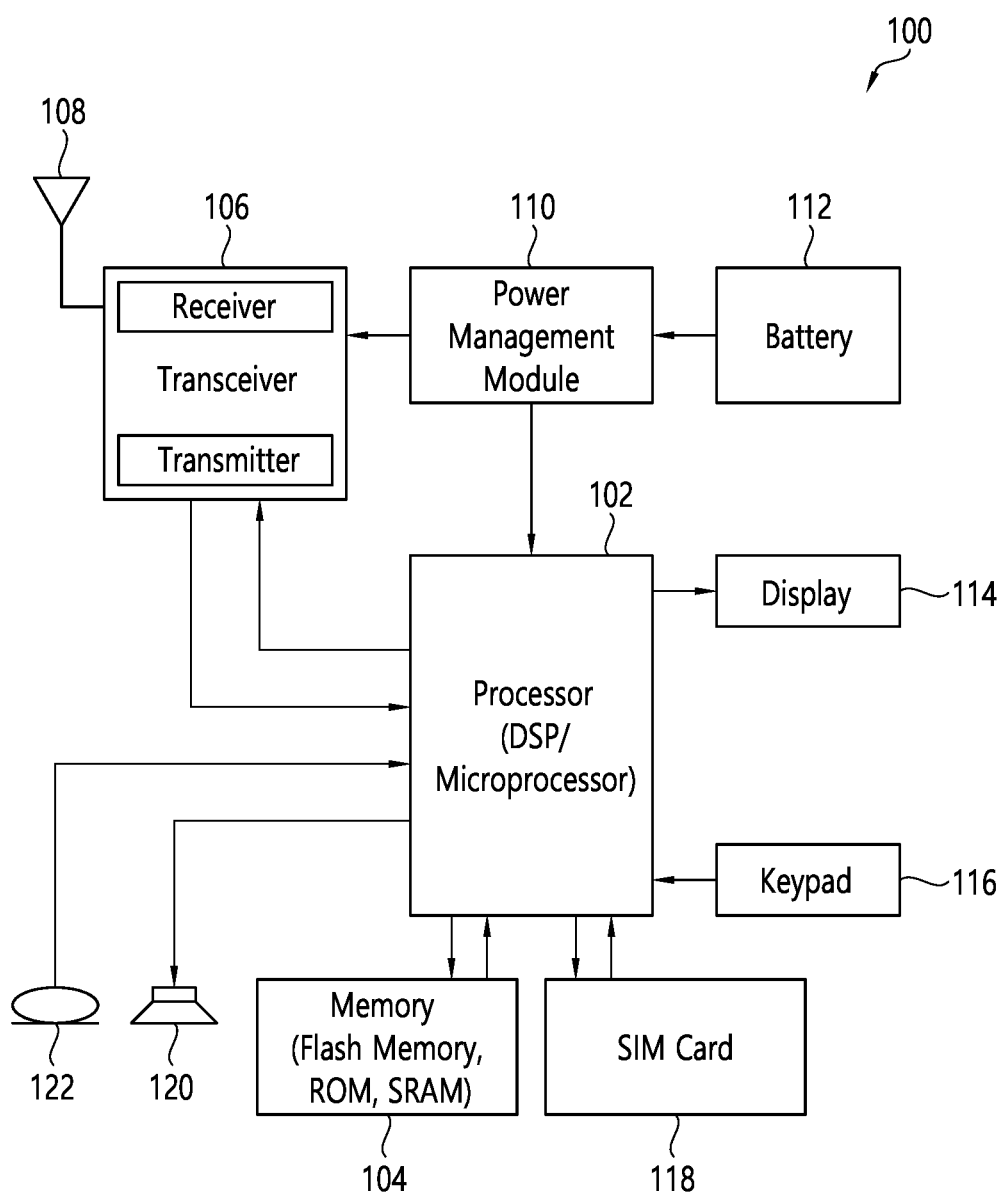
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
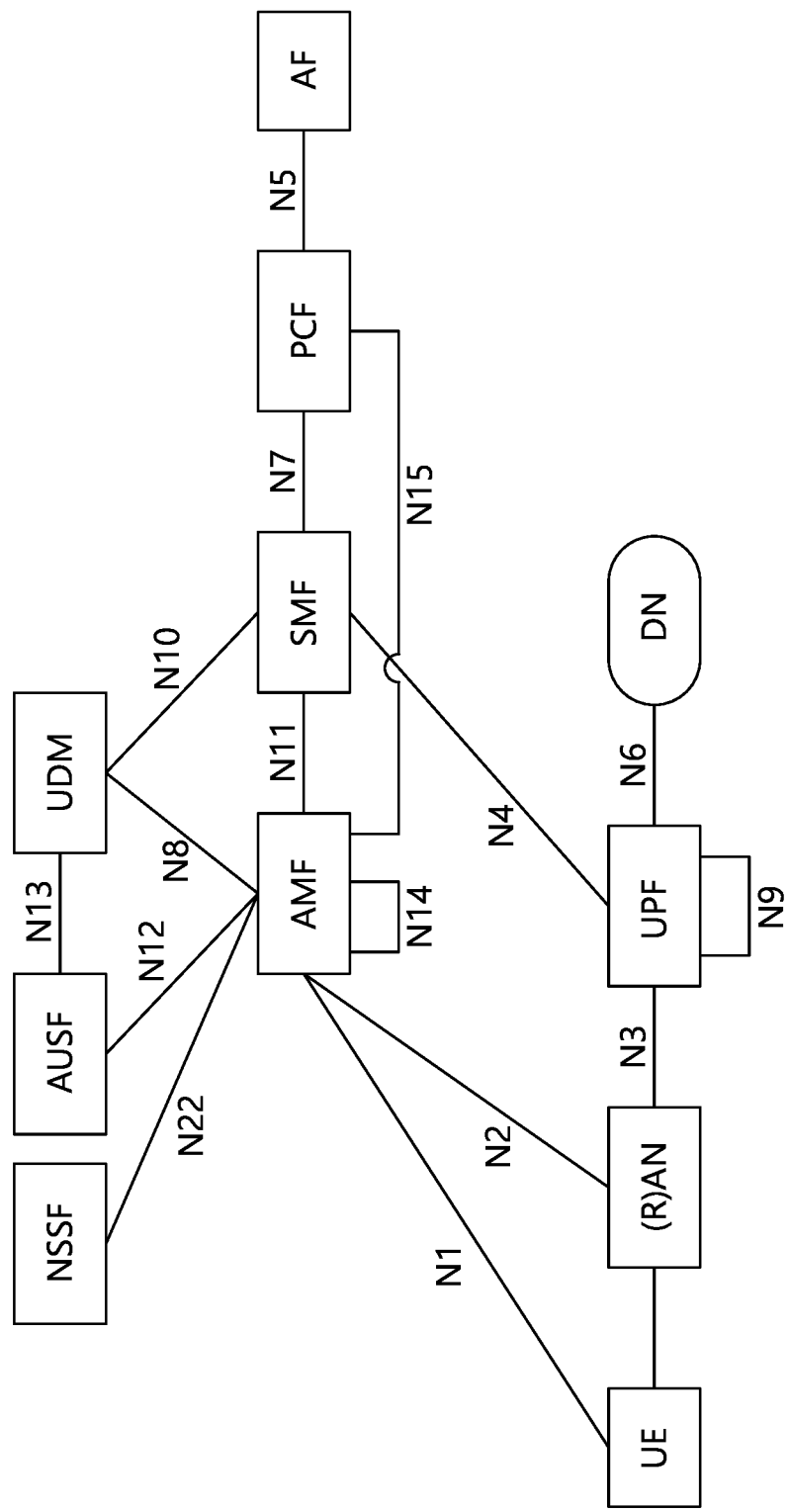
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).

Authentication Server Function (AUSF)
    Access and Mobility Management Function (AMF)
    Data Network (DN), e.g., operator services, Internet access or 3rd party services
    Unstructured Data Storage Function (UDSF)
    Network Exposure Function (NEF)
    Intermediate NEF (I-NEF)
    Network Repository Function (NRF)
    Network Slice Selection Function (NSSF)
    Policy Control Function (PCF)
    Session Management Function (SMF)
    Unified Data Management (UDM)
    Unified Data Repository (UDR)

User Plane Function (UPF)
UE radio Capability Management Function (UCMF)
Application Function (AF)
User Equipment (UE)
(Radio) Access Network ((R)AN)
5G-Equipment Identity Register (5G-EIR)
Network Data Analytics Function (NWDAF)
CHarging Function (CHF)

Furthermore, the following network functions may be considered.

Non-3GPP InterWorking Function (N3IWF)
Trusted Non-3GPP Gateway Function (TNGF)
Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:

N1: Reference point between the UE and the AMF.
N2: Reference point between the (R)AN and the AMF.
N3: Reference point between the (R)AN and the UPF.
N4: Reference point between the SMF and the UPF.
N6: Reference point between the UPF and a Data Network.
N9: Reference point between two UPFs.

The following reference points show the interactions that exist between the NF services in the NFs.

N5: Reference point between the PCF and an AR
N7: Reference point between the SMF and the PCF.
N8: Reference point between the UDM and the AMF.
N10: Reference point between the UDM and the SMF.
N11: Reference point between the AMF and the SMF.
N12: Reference point between the AMF and the AUSF.
N13: Reference point between the UDM and the AUSF.
N14: Reference point between two AMFs.
N15: Reference point between the PCF and the AMF in the case of non-roaming scenario, PCF in the visited network and AMF in the case of roaming scenario.
N16: Reference point between two SMFs, (in roaming case between SMF in the visited network and the SMF in the home network).
N22: Reference point between the AMF and the NSSF.

In some cases, a couple of NFs may need to be associated with each other to serve a UE.

A registration procedure is described. Section 4.2.2.2 of 3GPP TS 23.502 V16.3.0 (2019-12) can be referred.

Figure 6:
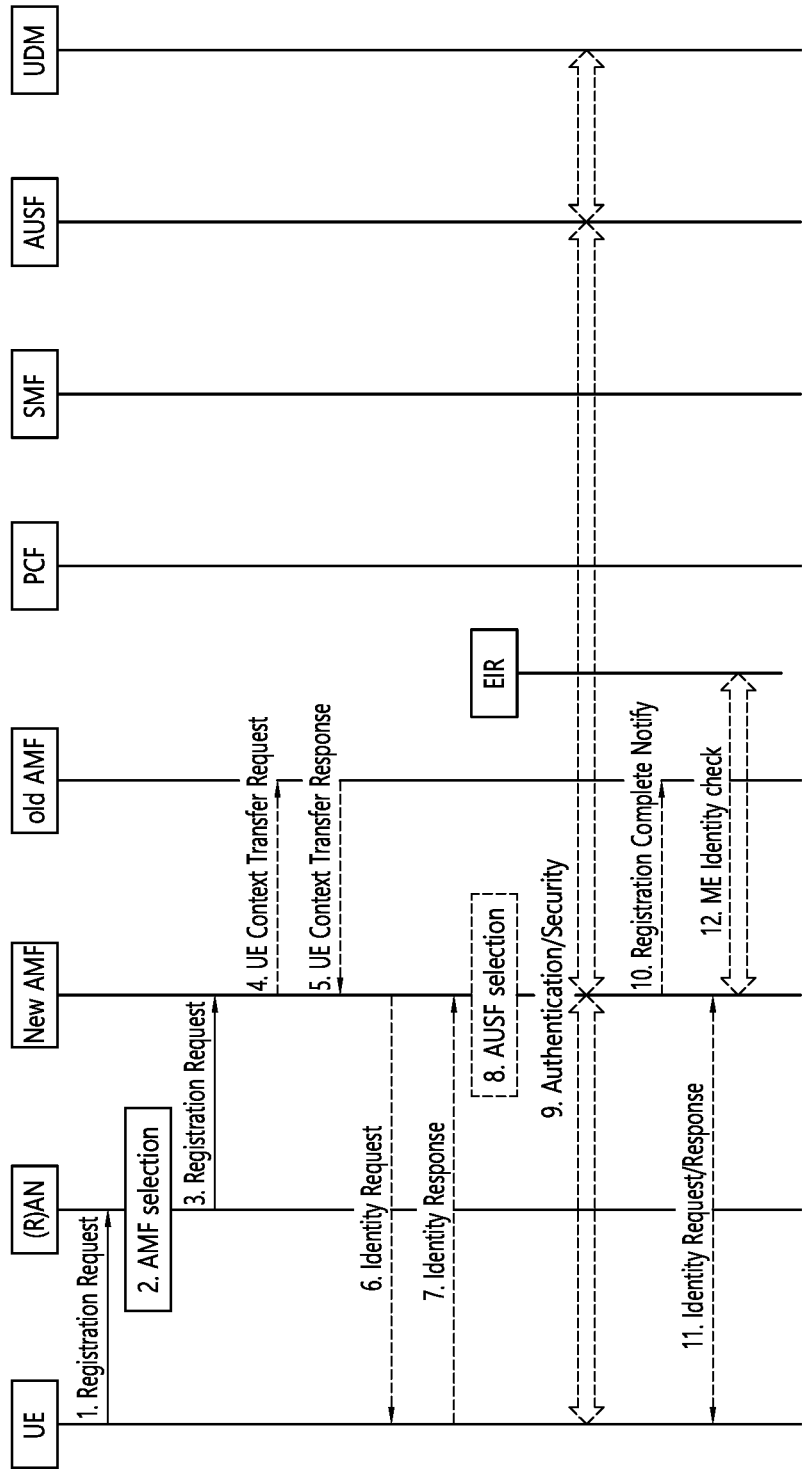
FIGS. 6 and 7 show an example of a registration procedure to which implementations of the present disclosure is applied.
Figure 7:
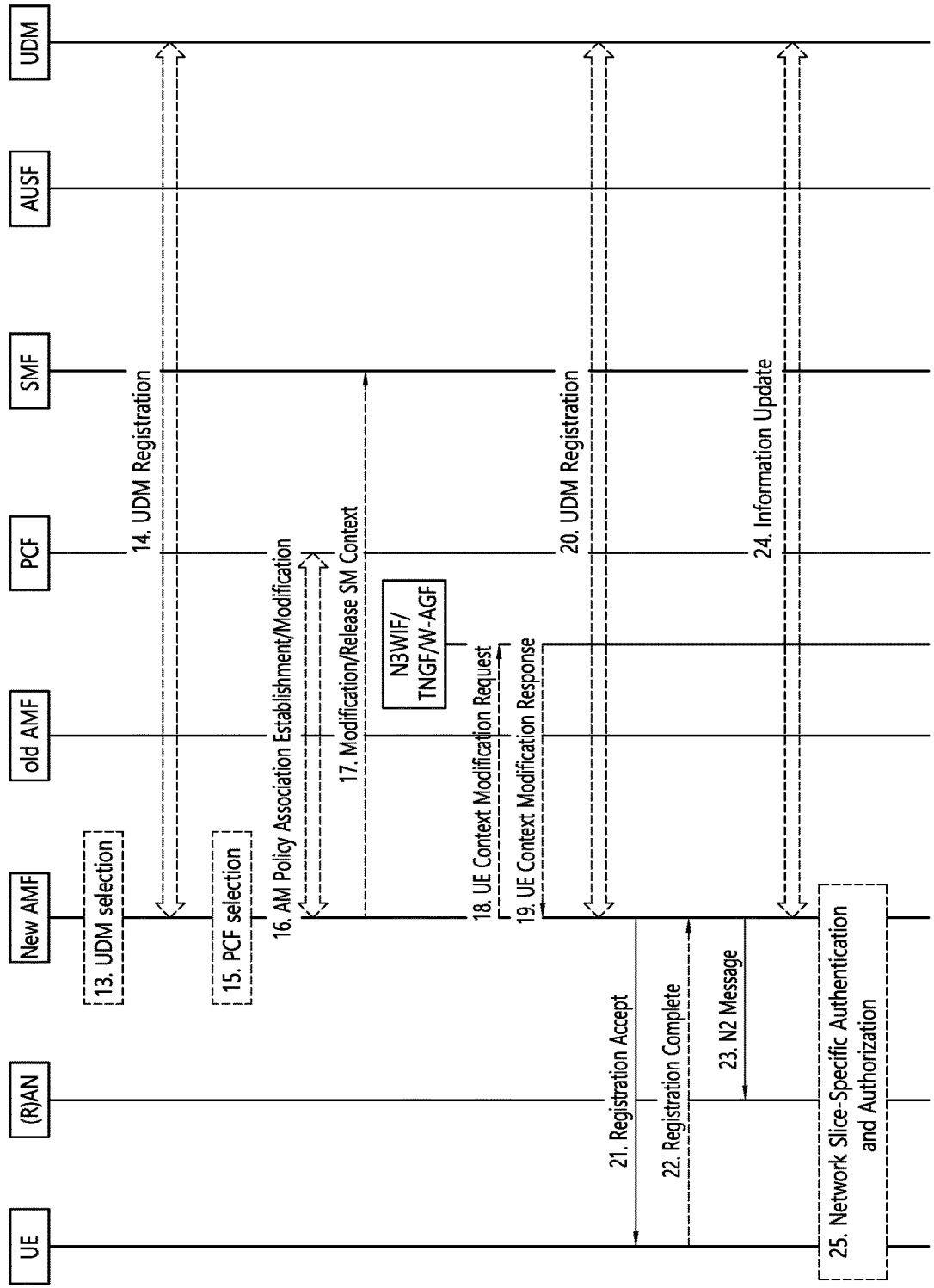

FIGS. 6 and 7 show an example of a registration procedure to which implementations of the present disclosure is applied.

A UE needs to register with the network to get authorized to receive services, to enable mobility tracking and to enable reachability. The UE initiates the registration procedure using one of the following registration types:

Initial registration to the 5GS; or
Mobility registration update; or
Periodic registration update; or
Emergency registration.

The general registration procedure in FIGS. 6 and 7 applies on all these registration procedures, but the periodic registration update need not include all parameters that are used in other registration cases.

The general registration procedure in FIGS. 6 and 7 is also used for the case of registration in 3GPP access when the UE is already registered in a non-3GPP access, and vice versa. Registration in 3GPP access when the UE is already registered in a non-3GPP access scenario may require an AMF change.

First, procedures of FIG. 6 are described.

(1) Step 1: The UE transmits a Registration Request message to the (R)AN. The Registration Request message corresponds to AN message.

The Registration Request message may include AN parameters. In the case of NG-RAN, the AN parameters include, e.g., 5G SAE temporary mobile subscriber identity (5G-S-TMSI) or globally unique AMF ID (GUAMI), the selected public land mobile network (PLMN) ID (or PLMN ID and network identifier (NID)) and Requested network slice selection assistance information (NSSAI). The AN parameters also include establishment cause. The establishment cause provides the reason for requesting the establishment of an RRC connection. Whether and how the UE includes the Requested NSSAI as part of the AN parameters is dependent on the value of the access stratum connection establishment NSSAI inclusion mode parameter.

The Registration Request message may include a registration type. The registration type indicates if the UE wants to perform an initial registration (i.e., the UE is in RM-DEREGISTERED state), a mobility registration update (i.e., the UE is in RM-REGIS TERED state and initiates a registration procedure due to mobility or due to the UE needs to update its capabilities or protocol parameters, or to request a change of the set of network slices it is allowed to use), a periodic registration update (i.e., the UE is in RM-REGISTERED state and initiates a registration procedure due to the periodic registration update timer expiry) or an emergency registration (i.e., the UE is in limited service state).

When the UE is performing an initial registration, the UE shall indicate its UE identity in the Registration Request message as follows, listed in decreasing order of preference:

i) a 5G globally unique temporary identifier (5G-GUTI) mapped from an evolved packet system (EPS) GUTI, if the UE has a valid EPS GUTI.

ii) a native 5G-GUTI assigned by the PLMN to which the UE is attempting to register, if available;

iii) a native 5G-GUTI assigned by an equivalent PLMN to the PLMN to which the UE is attempting to register, if available;

iv) a native 5G-GUTI assigned by any other PLMN, if available.

v) Otherwise, the UE shall include its subscriber concealed identifier (SUCI) in the Registration Request message.

When the UE performing an initial registration has both a valid EPS GUTI and a native 5G-GUTI, the UE shall also indicate the native 5G-GUTI as additional GUTI. If more than one native 5G-GUTIs are available, the UE shall select the 5G-GUTI in decreasing order of preference among items (ii)-(iv) in the list above.

When the UE is performing an initial registration with a native 5G-GUTI, then the UE shall indicate the related GUAMI information in the AN parameters. When the UE is performing an initial registration with its SUCI, the UE shall not indicate any GUAMI information in the AN parameters.

For an emergency registration, the SUCI shall be included if the UE does not have a valid 5G-GUTI available; the permanent equipment identifier (PEI) shall be included when the UE has no subscriber permanent identifier (SUPI) and no valid 5G-GUTI. In other cases, the 5G-GUTI is included and it indicates the last serving AMF.

The Registration Request message may also include security parameters, PDU Session Status, etc. The security parameters are used for authentication and integrity protection. The PDU Session Status indicates the previously established PDU sessions in the UE. When the UE is connected to the two AMFs belonging to different PLMN via 3GPP access and non-3GPP access then the PDU Session status indicates the established PDU Session of the current PLMN in the UE.

(2) Step 2: The (R)AN selects an AMF.

If a 5G-S-TMSI or GUAMI is not included or the 5G-S-TMSI or GUAMI does not indicate a valid AMF, the (R)AN, based on (R)AT and requested NSSAI, if available, selects an AMF.

If UE is in CM-CONNECTED state, the (R)AN can forward the Registration Request message to the AMF based on the N2 connection of the UE.

If the (R)AN cannot select an appropriate AMF, it forwards the Registration Request message to an AMF which has been configured, in the (R)AN, to perform AMF selection.

(3) Step 3: The (R)AN transmits a Registration Request message to the new AMF. The Registration Request message corresponds to N2 message.

The Registration Request message may include whole information and/or a part of information included in the Registration Request message received from the UE which is described in step 1.

The Registration Request message may include N2 parameters. When NG-RAN is used, the N2 parameters include the selected PLMN ID (or PLMN ID and NID), location information and cell identity related to the cell in which the UE is camping, UE context request which indicates that a UE context including security information needs to be setup at the NG-RAN. When NG-RAN is used, the N2 parameters shall also include the establishment cause.

If the Registration type indicated by the UE is Periodic Registration Update, then steps 4 to 19 may be omitted.

(4) Step 4: If the UE's 5G-GUTI was included in the Registration Request message and the serving AMF has changed since last registration procedure, the new AMF may invoke the Namf_Communication_UEContextTransfer service operation on the old AMF including the complete registration request non-access stratum (NAS) message to request the UE's SUPI and UE context.

(5) Step 5: The Old AMF may respond to the new AMF for the Namf_Communication_UEContextTransfer invocation by including the UE's SUPI and UE context.

(6) Step 6: If the SUCI is not provided by the UE nor retrieved from the old AMF, the identity request procedure may be initiated by the new AMF sending the Identity Request message to the UE requesting the SUCI.

(7) Step 7: The UE may respond with an Identity Response message including the SUCI. The UE derives the SUCI by using the provisioned public key of the home PLMN (HPLMN).

(8) Step 8: The new AMF may decide to initiate UE authentication by invoking an AUSF. In that case, the new AMF selects an AUSF based on SUPI or SUCI.

(9) Step 9: Authentication/security may be established by the UE, new AMF, AUSF and/or UDM.

(10) Step 10: If the AMF has changed, the new AMF may notify the old AMF that the registration of the UE in the new AMF is completed by invoking the Namf_Communication_RegistrationCompleteNotify service operation. If the authentication/security procedure fails, then the registration shall be rejected, and the new AMF may invoke the Namf_Communication_RegistrationCompleteNotify service operation with a reject indication reason code towards the old AMF. The old AMF may continue as if the UE context transfer service operation was never received.

(11) Step 11: If the PEI was not provided by the UE nor retrieved from the old AMF, the Identity Request procedure may be initiated by the new AMF sending an Identity Request message to the UE to retrieve the PEI. The PEI shall be transferred encrypted unless the UE performs emergency registration and cannot be authenticated.

(12) Step 12: Optionally, the new AMF may initiate ME identity check by invoking the N5g-eir_EquipmentIdentityCheck_Get service operation.

Now, procedures of FIG. 7, which follow the procedures of FIG. 6, are described.

(13) Step 13: If step 14 below is to be performed, the new AMF, based on the SUPI, may select a UDM, then UDM may select a UDR instance.

(14) Step 14: The new AMF may register with the UDM.

(15) Step 15: The new AMF may select a PCF.

(16) Step 16: The new AMF may optionally perform an AM Policy Association Establishment/Modification.

(17) Step 17: The new AMF may transmit Update/Release SM Context message (e.g., Nsmf_PDUSession_UpdateSMContext and/or Nsmf_PDUSession_ReleaseSMContext) to the SMF.

(18) Step 18: If the new AMF and the old AMF are in the same PLMN, the new AMF may send a UE Context Modification Request to the N3IWF/TNGF/W-AGF.

(19) Step 19: The N3IWF/TNGF/W-AGF may send a UE Context Modification Response to the new AMF.

(20) Step 20: After the new AMF receives the response message from the N3IWF/TNGF/W-AGF in step 19, the new AMF may register with the UDM.

(21) Step 21: The new AMF transmits a Registration Accept message to the UE.

The new AMF sends a Registration Accept message to the UE indicating that the Registration Request has been accepted. 5G-GUTI is included if the new AMF allocates a new 5G-GUTI. If the UE is already in RM-REGISTERED state via another access in the same PLMN, the UE shall use the 5G-GUTI received in the Registration Accept message for both registrations. If no 5G-GUTI is included in the Registration Accept message, then the UE uses the 5G-GUTI assigned for the existing registration also for the new registration. If the new AMF allocates a new registration area, it shall send the registration area to the UE via Registration Accept message. If there is no registration area included in the Registration Accept message, the UE shall consider the old registration area as valid. Mobility Restrictions is included in case mobility restrictions applies for the UE and registration type is not emergency registration. The new AMF indicates the established PDU sessions to the UE in the PDU Session status. The UE removes locally any internal resources related to PDU sessions that are not marked as established in the received PDU Session status. When the UE is connected to the two AMFs belonging to different PLMN via 3GPP access and non-3GPP access then the UE removes locally any internal resources related to the PDU session of the current PLMN that are not marked as established in received PDU Session status. If the PDU Session status information was in the Registration Request message, the new AMF shall indicate the PDU Session status to the UE.

The Allowed NSSAI provided in the Registration Accept message is valid in the registration area and it applies for all the PLMNs which have their tracking areas included in the registration area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the serving PLMN to the HPLMN S-NSSAIs.

Furthermore, optionally the new AMF performs a UE Policy Association Establishment.

(22) Step 22: The UE may send a Registration Complete message to the new AMF when it has successfully updated itself.

The UE may send a Registration Complete message to the new AMF to acknowledge if a new 5G-GUTI was assigned.

(23) Step 23: For registration over 3GPP Access, if the new AMF does not release the signaling connection, the new AMF may send the RRC Inactive Assistance Information to the NG-RAN. For registration over non-3GPP Access, if the UE is also in CM-CONNECTED state on 3GPP access, the new AMF may send the RRC
Inactive Assistance Information to the NG-RAN.

(24) Step 24: The new AMF may perform information update towards the UDM.

(25) Step 25: The UE may execute Network Slice-Specific Authentication and Authorization procedure.

A PDU session establishment procedure is described. Section 4.3.2 of 3GPP TS 23.502 V16.3.0 (2019-12) can be referred.

Figure 8:
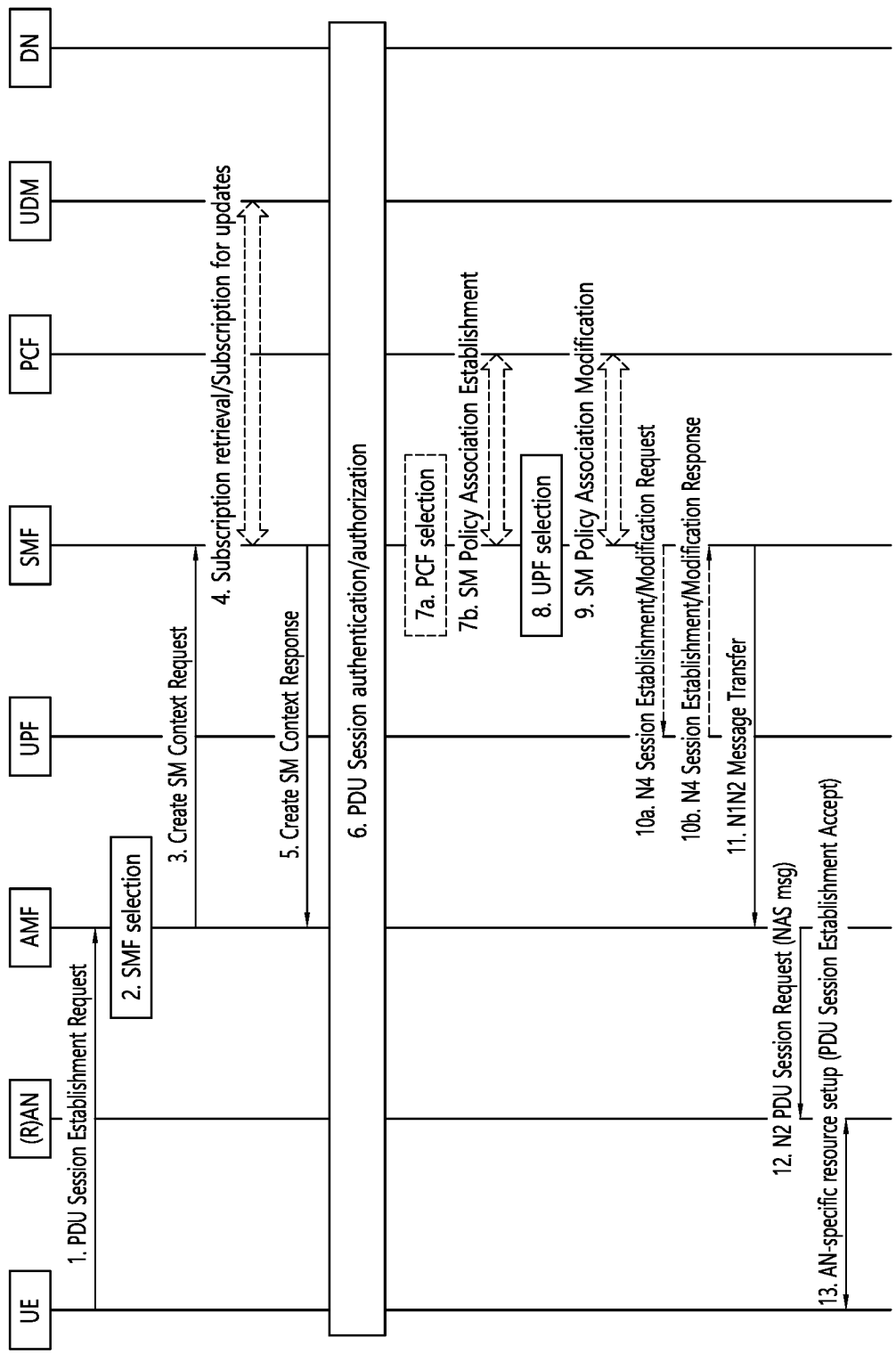
FIGS. 8 and 9 show an example of a PDU session establishment procedure to which implementations of the present disclosure is applied.
Figure 9:
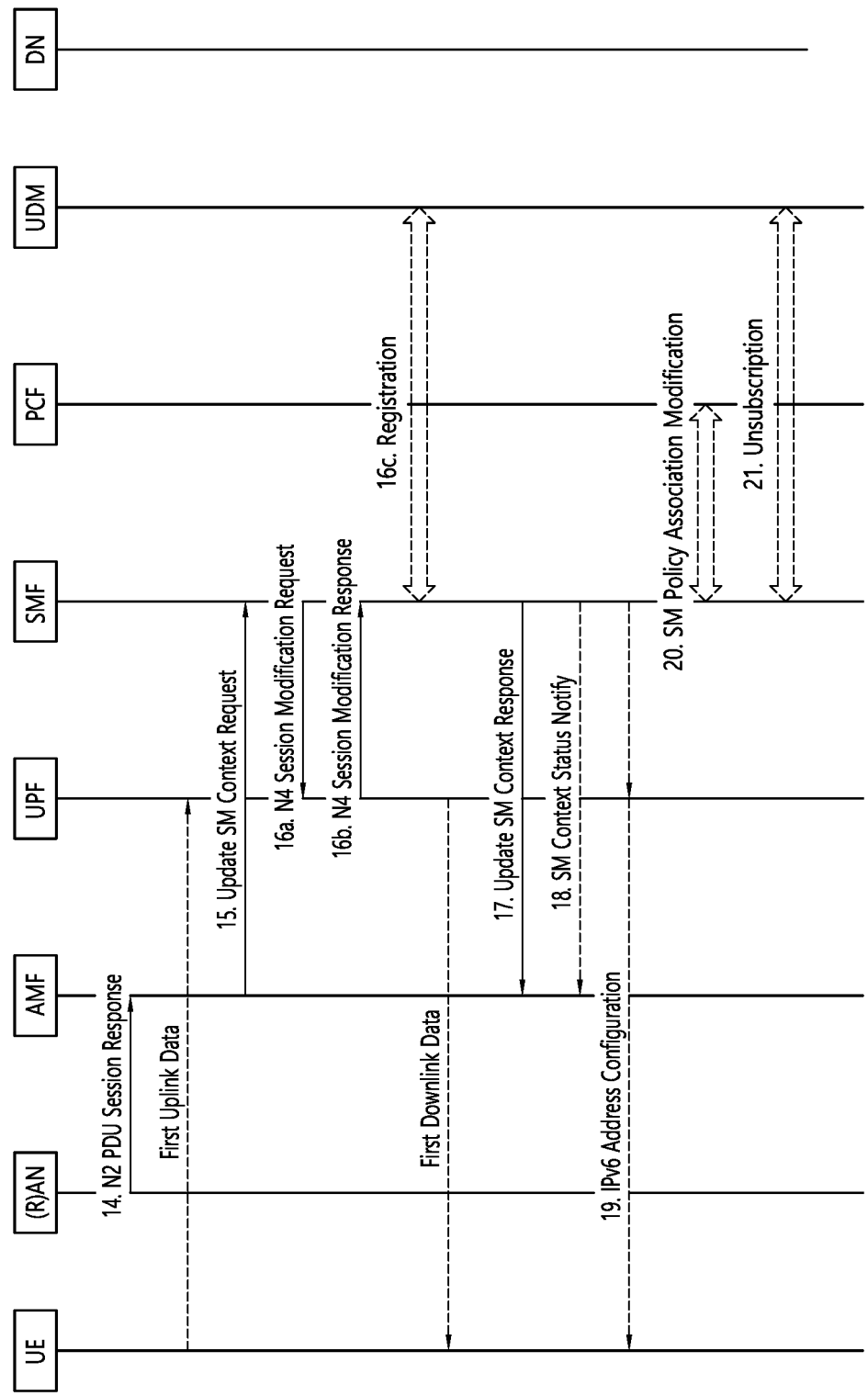

FIGS. 8 and 9 show an example of a PDU session establishment procedure to which implementations of the present disclosure is applied.

A PDU session establishment may correspond to:
 a UE initiated PDU session establishment procedure.
 a UE initiated PDU session handover between 3GPP and non-3GPP.
 a UE initiated PDU session handover from EPS to 5GS.
 a network triggered PDU session establishment procedure.

A PDU session may be associated either (a) with a single access type at a given time, i.e., either 3GPP access or non-3GPP access, or (b) simultaneously with multiple access types, i.e., one 3GPP access and one non-3GPP access. A PDU session associated with multiple access types is referred to as multi access PDU (MA PDU) session and it may be requested by access traffic steering, switching, splitting (ATSSS)-capable UEs.

FIGS. 8 and 9 specify the procedures for establishing PDU sessions associated with a single access type at a given time.

The procedure shown in FIGS. 8 and 9 assumes that the UE has already registered on the AMF thus unless the UE is emergency registered the AMF has already retrieved the user subscription data from the UDM.

First, procedures of FIG. 8 are described.

(1) Step 1: In order to establish a new PDU session, the UE generates a new PDU session ID.

The UE initiates the UE requested PDU session establishment procedure by the transmission of a NAS message containing a PDU Session Establishment Request message within the N1 SM container. The PDU Session Establishment Request message includes a PDU session ID, Requested PDU Session Type, a Requested session and service continuity (SSC) mode, SGSM Capability, protocol configuration options (PCO), SM PDU DN Request Container, UE Integrity Protection Maximum Data Rate, etc.

The Request Type indicates "Initial request" if the PDU session establishment is a request to establish a new PDU session and indicates "Existing PDU Session" if the request refers to an existing PDU session switching between 3GPP access and non-3GPP access or to a PDU session handover from an existing packet data network (PDN) connection in EPC. The Request Type indicates "Emergency Request" if the PDU session establishment is a request to establish a PDU session for emergency services. The Request Type indicates "Existing Emergency PDU Session" if the request refers to an existing PDU session for emergency services switching between 3GPP access and non-3GPP access or to a PDU session handover from an existing PDN connection for emergency services in EPC.

The UE includes the S-NSSAI from the Allowed NSSAI of the current access type. If the Mapping of Allowed NSSAI was provided to the UE, the UE shall provide both the S-NSSAI of the visited PLMN (VPLMN) from the Allowed NSSAI and the corresponding S-NSSAI of the HPLMN from the Mapping Of Allowed NSSAI.

(2) Step 2: The AMF selects an SMF. If the Request Type indicates "Initial request" or the request is due to handover from EPS or from non-3GPP access serving by a different AMF, the AMF stores an association of the S-NSSAI(s), the data network name (DNN), the PDU session ID, the SMF ID as well as the Access Type of the PDU session.

If the Request Type is "initial request" and if the Old PDU session ID indicating the existing PDU session is also contained in the message, the AMF selects an SMF and stores an association of the new PDU Session ID, the S-NSSAI(s), the selected SMF ID as well as Access Type of the PDU Session.

If the Request Type indicates "Existing PDU Session", the AMF selects the SMF based on SMF-ID received from UDM. The AMF updates the Access Type stored for the PDU session.

If the Request Type indicates "Existing PDU Session" referring to an existing PDU session moved between 3GPP access and non-3GPP access, then if the serving PLMN S-NSSAI of the PDU session is present in the Allowed NSSAI of the target access type, the PDU session establishment procedure can be performed in the following cases:
 the SMF ID corresponding to the PDU session ID and the AMF belong to the same PLMN;
 the SMF ID corresponding to the PDU session ID belongs to the HPLMN;

Otherwise the AMF shall reject the PDU session establishment request with an appropriate reject cause.

The AMF shall reject a request coming from an emergency registered UE and the Request Type indicates neither "Emergency Request" nor "Existing Emergency PDU Session".

(3) Step 3: If the AMF does not have an association with an SMF for the PDU session ID provided by the UE (e.g., when Request Type indicates "initial request"), the AMF invokes Create SM Context Request procedure (e.g., Nsmf_PDUSession_CreateSMContext Request). If the AMF already has an association with an SMF for the PDU session ID provided by the UE (e.g., when Request Type indicates "existing PDU Session"), the AMF invokes Update SM Context Request procedure (e.g., Nsmf_PDUSession_UpdateSMContext Request).

The AMF sends the S-NSSAI of the serving PLMN from the Allowed NSSAI to the SMF. For roaming scenario in local breakout (LBO), the AMF also sends the corresponding S-NSSAI of the HPLMN from the Mapping Of Allowed NSSAI to the SMF.

The AMF ID is the UE's GUAMI which uniquely identifies the AMF serving the UE. The AMF forwards the PDU session ID together with the N1 SM container containing the PDU Session Establishment Request message received from the UE. The generic public subscription identifier (GPSI) shall be included if available at AMF.

The AMF provides the PEI instead of the SUPI when the UE in limited service state has registered for emergency services without providing a SUPI. In case the UE in limited service state has registered for Emergency services with a SUPI but has not been authenticated, the AMF indicates that the SUPI has not been authenticated. The SMF determines that the UE has not been authenticated when it does not receive a SUPI for the UE or when the AMF indicates that the SUPI has not been authenticated.

The AMF may include a PCF ID in the Nsmf_PDUSession_CreateSMContext Request. This PCF ID identifies the home PCF (H-PCF) in the non-roaming case and the visited PCF (V-PCF) in the LBO roaming case.

(4) Step 4: If session management subscription data for corresponding SUPI, DNN and S-NSSAI of the HPLMN is not available, then SMF may retrieve the session management subscription data from the UDM and subscribes to be notified when this subscription data is modified.

(5) Step 5: The SMF transmits either Create SM Context Response message (e.g., Nsmf_PDUSession_CreateSMContext Response) or Update SM Context Response message (e.g., Nsmf_PDUSession_UpdateSMContext Response) to the AMF, depending on the request received in step 3.

If the SMF received Nsmf_PDUSession_CreateSMContext Request in step 3 and the SMF is able to process the PDU session establishment request, the SMF creates an SM context and responds to the AMF by providing an SM Context ID.

When the SMF decides to not accept to establish a PDU session, the SMF rejects the UE request via NAS SM signaling including a relevant SM rejection cause by responding to the AMF with Nsmf_PDUSession_CreateSMContext Response. The SMF also indicates to the AMF that the PDU session ID is to be considered as released, the SMF proceeds to step 20 below and the PDU session establishment procedure is stopped.

(6) Step 6: Optional secondary authentication/authorization may be performed.

(7a) Step 7a: If dynamic policy and charging control (PCC) is to be used for the PDU session, the SMF may perform PCF selection.

(7b) Step 7b: The SMF may perform an SM Policy Association Establishment procedure to establish an SM Policy association with the PCF and get the default PCC rules for the PDU session.

(8) Step 8: The SMF selects one or more UPFs.

(9) Step 9: The SMF may perform an SMF initiated SM Policy Association Modification procedure to provide information on the policy control request trigger condition(s) that have been met.

(10) Step 10: If Request Type indicates "initial request", the SMF may initiate an N4 Session Establishment procedure with the selected UPF. Otherwise, the SMF may initiate an N4 Session Modification procedure with the selected UPF In step 10a, the SMF may send an N4 Session Establishment/Modification Request to the UPF and provides packet detection, enforcement and reporting rules to be installed on the UPF for this PDU session. In step 10b, the UPF may acknowledge by sending an N4 Session Establishment/Modification Response.

(11) Step 11: The SMF transmits a N1N2Message Transfer message (e.g., Namf_Communication_N1N2MessageTransfer) to the AMF.

The N1N2Message Transfer message may include N2 SM information. The N2 SM information carries information that the AMF shall forward to the (R)AN which may include:

The CN Tunnel Info: Core network address(es) of the N3 tunnel corresponding to the PDU session;
One or multiple quality of service (QoS) profiles and the corresponding QoS flow IDs (QFIs);
The PDU session ID: indicate to the UE the association between (R)AN resources and a PDU session for the UE.
S-NSSAI with the value for the serving PLMN (i.e., the HPLMN S-NSSAI or, in LBO roaming case, the VPLMN S-NSSAI).
User Plane Security Enforcement information determined by the SMF.
If the User Plane Security Enforcement information indicates that integrity protection is "Preferred" or "Required", the SMF also includes the UE Integrity Protection Maximum Data Rate as received in the PDU Session Establishment Request message.
Redundancy sequence number (RSN) parameter The N1N2Message Transfer message may include N1 SM container. The N1 SM container contains the PDU Session Establishment Accept message that the AMF shall provide to the UE. The PDU Session Establishment Accept message includes S-NSSAI from the Allowed NSSAI. For LBO roaming scenario, the PDU Session Establishment Accept message includes the S-NSSAI from the Allowed NSSAI for the VPLMN and also it includes the corresponding S-NSSAI of the HPLMN from the Mapping Of Allowed NSSAI that SMF received in step 3.

Multiple QoS Rules, QoS flow level, QoS parameters if needed for the QoS Flow(s) associated with those QoS rule(s) and QoS Profiles may be included in the PDU Session Establishment Accept message within the N1 SM container and in the N2 SM information.

If the PDU session establishment failed anywhere between step 5 and step 11, then the N1N2Message Transfer message shall include the N1 SM container with a PDU Session Establishment Reject message and shall not include any N2 SM information. The (R)AN sends the NAS message containing the PDU Session Establishment Reject message to the UE. In this case, steps 12-17 are skipped.

(12) Step 12: The AMF sends the NAS message containing PDU Session ID and PDU Session Establishment Accept message targeted to the UE and the N2 SM information received from the SMF within the N2 PDU Session Request message to the (R)AN.

(13) Step 13: The (R)AN may issue AN specific signaling exchange with the UE that is related with the information received from SMF. For example, in case of a NG-RAN, an RRC connection reconfiguration may take place with the UE establishing the necessary NG-RAN resources related to the QoS rules for the PDU session request received in step 12.

The (R)AN forwards the NAS message (PDU Session ID, N1 SM container (PDU Session Establishment Accept message)) provided in step 12 to the UE. The (R)AN shall only provide the NAS message to the UE if the AN specific signaling exchange with the UE includes the (R)AN resource additions associated to the received N2 command.

If the N2 SM information is not included in the step 11, then the following steps 14 to 16b and step 17 are omitted.

Now, procedures of FIG. 9, which follow the procedures of FIG. 8, are described.

(14) Step 14: The (R)AN transmits a N2 PDU Session Response message to the AMF. The N2 PDU Session Response message may include PDU session ID, Cause, N2 SM information (PDU Session ID, AN Tunnel Info, List of accepted/rejected QFI(s), User Plane Enforcement Policy Notification)), etc.

(15) Step 15: The AMF transmits an Update SM Context Request message (e.g., Nsmf_PDUSession_UpdateSMContext Request) to the SMF. The AMF forwards the N2 SM information received from (R)AN to the SMF.

(16a) Step 516a: The SMF initiates an N4 Session Modification procedure with the UPF. The SMF provides AN Tunnel Info to the UPF as well as the corresponding forwarding rules.

(16b) Step 516b: The UPF provides an N4 Session Modification Response to the SMF.

After this step, the UPF may deliver any DL packets to the UE that may have been buffered for this PDU session.

(16c) Step 16c: If the SMF has not yet registered for this PDU session, then the SMF may register with the UDM for a given PDU Session.

(17) Step 17: The SMF transmits an Update SM Context Response message (e.g., Nsmf_PDUSession_UpdateSMContext Response) to the AMF.

After this step, the AMF forwards relevant events subscribed by the SMF.

(18) Step 18: If during the procedure, any time after step 5, the PDU session establishment is not successful, the SMF may inform the AMF by invoking Nsmf_PDUSession_SMContextStatusNotify (Release). The SMF may also release any N4 session(s) created, any PDU session address if allocated (e.g., IP address) and release the association with PCF, if any. In this case, step 19 is skipped.

(19) Step 19: In the case of PDU Session Type IPv6 or IPv4v6, the SMF may generate an IPv6 Router Advertisement and send it to the UE.

(20) Step 20: The SMF may perform SMF initiated SM Policy Association Modification.

(21) Step 21: If the PDU Session establishment failed after step 4, the SMF may unsubscribe to the modifications of session management subscription data, if the SMF is no more handling a PDU session of the UE.

Support of non-3GPP access is described. Section 4.2.8.1 of 3GPP TS 23.501 V16.3.0 (2019-12) can be referred.

Figure 10:
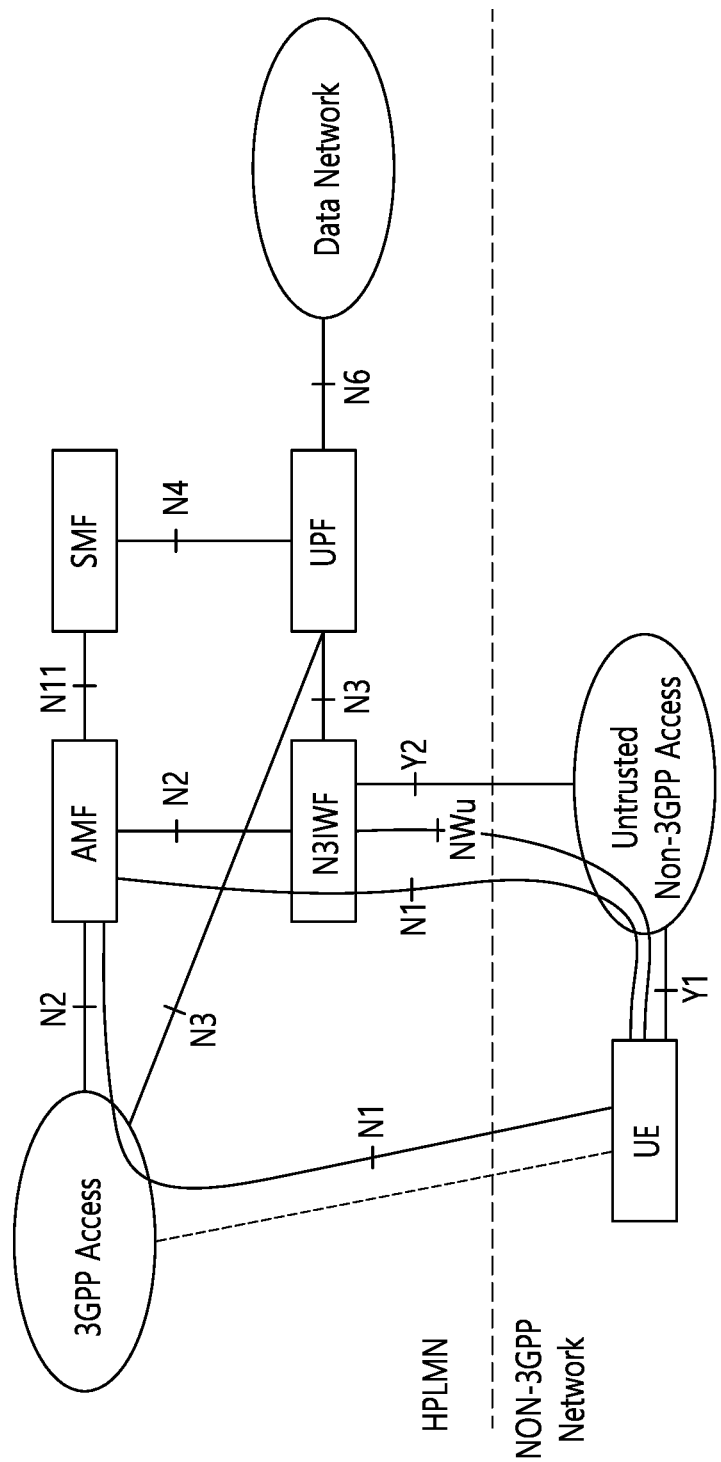
FIG. 10 shows an example of non-roaming architecture for 5GC with untrusted non-3GPP access to which implementations of the present disclosure is applied.

FIG. 10 shows an example of non-roaming architecture for 5GC with untrusted non-3GPP access to which implementations of the present disclosure is applied.

The 5G Core Network supports connectivity of UEs via non-3GPP access networks, e.g., wireless local area network (WLAN) access networks.

The 5G Core Network supports both untrusted non-3GPP access networks and trusted non-3GPP access networks (TNANs).

An untrusted non-3GPP access network shall be connected to the 5G Core Network via a N3IWF, whereas a trusted non-3GPP access network shall be connected to the 5G Core Network via a TNGF. Both the N3IWF and the TNGF interface with the 5G Core Network CP and UP functions via the N2 and N3 interfaces, respectively.

A non-3GPP access network may advertise the PLMNs for which it supports trusted connectivity and the type of supported trusted connectivity (e.g., "5G connectivity"). Therefore, the UEs can discover the non-3GPP access networks that can provide trusted connectivity to one or more PLMNs.

When the UE decides to use untrusted non-3GPP access to connect to a 5G Core Network in a PLMN:
  the UE first selects and connects with a non-3GPP access network; and then
  the UE selects a PLMN and an N3IWF in this PLMN. The PLMN/N3IWF selection and the non-3GPP access network selection are independent.

When the UE decides to use trusted non-3GPP access to connect to a 5G Core Network in a PLMN:
  the UE first selects a PLMN; and then
  the UE selects a non-3GPP access network (a TNAN) that supports trusted connectivity to the selected PLMN. In this case, the non-3GPP access network selection is affected by the PLMN selection.

A UE that accesses the 5G Core Network over a standalone non-3GPP access shall, after UE registration, support NAS signaling with 5G Core Network control-plane functions using the N1 reference point.

When a UE is connected via a NG-RAN and via a standalone non-3GPP access, multiple N1 instances shall exist for the UE, i.e., there shall be one N1 instance over NG-RAN and one N1 instance over non-3GPP access.

A UE simultaneously connected to the same 5G Core Network of a PLMN over a 3GPP access and a non-3GPP access shall be served by a single AMF in this 5G Core Network.

When a UE is connected to a 3GPP access of a PLMN, if the UE selects a N3IWF and the N3IWF is located in a PLMN different from the PLMN of the 3GPP access, e.g., in a different VPLMN or in the HPLMN, the UE is served separately by the two PLMNs. The UE is registered with two separate AMFs. PDU sessions over the 3GPP access are served by V-SMFs different from the V-SMF serving the PDU Sessions over the non-3GPP access. The same can be true when the UE uses trusted non-3GPP access, i.e., the UE may select one PLMN for 3GPP access and a different PLMN for trusted non-3GPP access.

The PLMN selection for the 3GPP access does not depend on the PLMN that is used for non-3GPP access. In other words, if a UE is registered with a PLMN over a non-3GPP access, the UE performs PLMN selection for the 3GPP access independently of this PLMN.

A UE shall establish an IPsec tunnel with the N3IWF or with the TNGF in order to register with the 5G Core Network over non-3GPP access.

It shall be possible to maintain the UE NAS signaling connection with the AMF over the non-3GPP access after all the PDU sessions for the UE over that access have been released or handed over to 3GPP access.

N1 NAS signaling over standalone non-3GPP accesses shall be protected with the same security mechanism applied for N1 over a 3GPP access.

Stand-alone non-public network (SNPN) is described. Section 5.30.2 of 3GPP TS 23.501 V16.3.0 (2019-12) can be referred.

An SNPN is operated by an NPN operator and not relying on network functions provided by a PLMN. On the other hand, a public network integrated (PNI) NPN is a non-public network deployed with the support of a PLMN.

SNPN 5GS deployments are based on the architecture depicted above in FIG. 5, the architecture for 5GC with untrusted non-3GPP access, described above in FIG. 10, for access to SNPN services via a PLMN (and vice versa) and the additional functionality described below.

Interworking with EPS is not supported for SNPN.

The combination of a PLMN ID and network identifier (NID) identifies an SNPN.

The NID shall support two assignment models:

Self-assignment: NIDs are chosen individually by SNPNs at deployment time (and may therefore not be unique) but use a different numbering space than the coordinated assignment NIDs.

Coordinated assignment: NIDs are assigned using one of the following two options:

1) The NID is assigned such that it is globally unique independent of the PLMN ID used; or 2) The NID is assigned such that the combination of the NID and the PLMN ID is globally unique.

An optional human-readable network name helps to identify an SNPN during manual SNPN selection.

When a UE is set to operate in SNPN access mode, the UE does not perform normal PLMN selection procedures.

UEs operating in SNPN access mode read the available PLMN IDs and list of available NIDs from the broadcast system information and take them into account during network selection.

For automatic network selection, the UE selects and attempts to register with the available SNPN identified by a PLMN ID and NID for which the UE has SUPI and credentials.

For manual network selection, UEs operating in SNPN access mode provide to the user the list of NIDs and related human-readable names (if available) of the available SNPNs the UE has respective SUPI and credentials for.

When a UE performs initial registration to an SNPN, the UE shall indicate the selected NID and the corresponding PLMN ID to NG-RAN. NG-RAN shall inform the AMF of the selected PLMN ID and NID.

To access PLMN services, a UE in SNPN access mode that has successfully registered with an SNPN may perform another registration via the SNPN user plane with a PLMN (using the credentials of that PLMN) following the same architectural principles as specified above for the non-3GPP access and the SNPN taking the role of "Untrusted non-3GPP access" in FIG. 10.

To access SNPN services, a UE that has successfully registered with a PLMN may perform another registration via the PLMN user plane with an SNPN (using the credentials of that SNPN) following the same architectural principles as specified above for the non-3GPP access and the PLMN taking the role of "Untrusted non-3GPP access" in FIG. 10.

Further enhancements of NPN are being discussed. One of the goals for further enhancements of NPN is to support data transfer between PLMN and SNPN to reduce data loss. In addition, one of the other goals for further enhancements of NPN is to support service continuity for the movement of the UE, when credentials are owned by an entity separate from SNPN.

For example, when the NPN supports video, imaging and audio for professional applications (VIAPA), data transfer between the PLMN and the SNPN for service continuity may be considered. In this case, whether there are support for service continuity (assuming PDU session anchor (PSA) may reside in either PLMN or in the NPN) between PLMN and NPN (SNPN or PNI-NPN) with overlapping radio coverage areas may be addressed. The data service from NPN can be the low latency and high data rate service while serving massive number of UEs in a small area (e.g., the integrated audience multicast service in large live production events, such as music festival).

For example, when a UE that has been provided with a service through a source network (PLMN or SNPN) moves toward a target network (SNPN or PLMN), the NG-RAN of the source network may attempt handover of the UE to the NG-RAN of the target network. However, if the N14 interface does not exist between the AMF of the source network and the AMF of the target network because a service level agreement (SLA) is not established between the source network and the target network, this handover attempt may fail. In order to ensure service continuity between the source network and the target network, the UE should again transmit a PDU session establishment request message indicating "existing PDU session" to the target network, but service continuity may not be guaranteed to the UE in this process. Alternatively, an unnecessary delay time may be caused until a service is provided again to the UE through a new network, thereby impairing the user experience.

In the present disclosure to be described below, a method and an apparatus for performing the corresponding method are provided in which a network guarantees service continuity to another network according to a network configuration situation and at the same time does not cause unnecessary delay time to the UE.

In the present disclosure to be described below, a new service operation may be defined and used instead of the conventional service operation for the service operation between NFs. In addition, in the present disclosure to be described below, a new N2 message may be defined and used instead of the conventional N2 message for the N2 message exchanged between the AMF and the NG-RAN. In addition, in the present disclosure to be described below, a new RRC message may be defined and used instead of the conventional RRC message for the RRC message exchanged between the NG-RAN and the UE.

In the present disclosure to be described below, some steps may be performed simultaneously and/or in parallel, or may be performed in a reversed order.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 11:
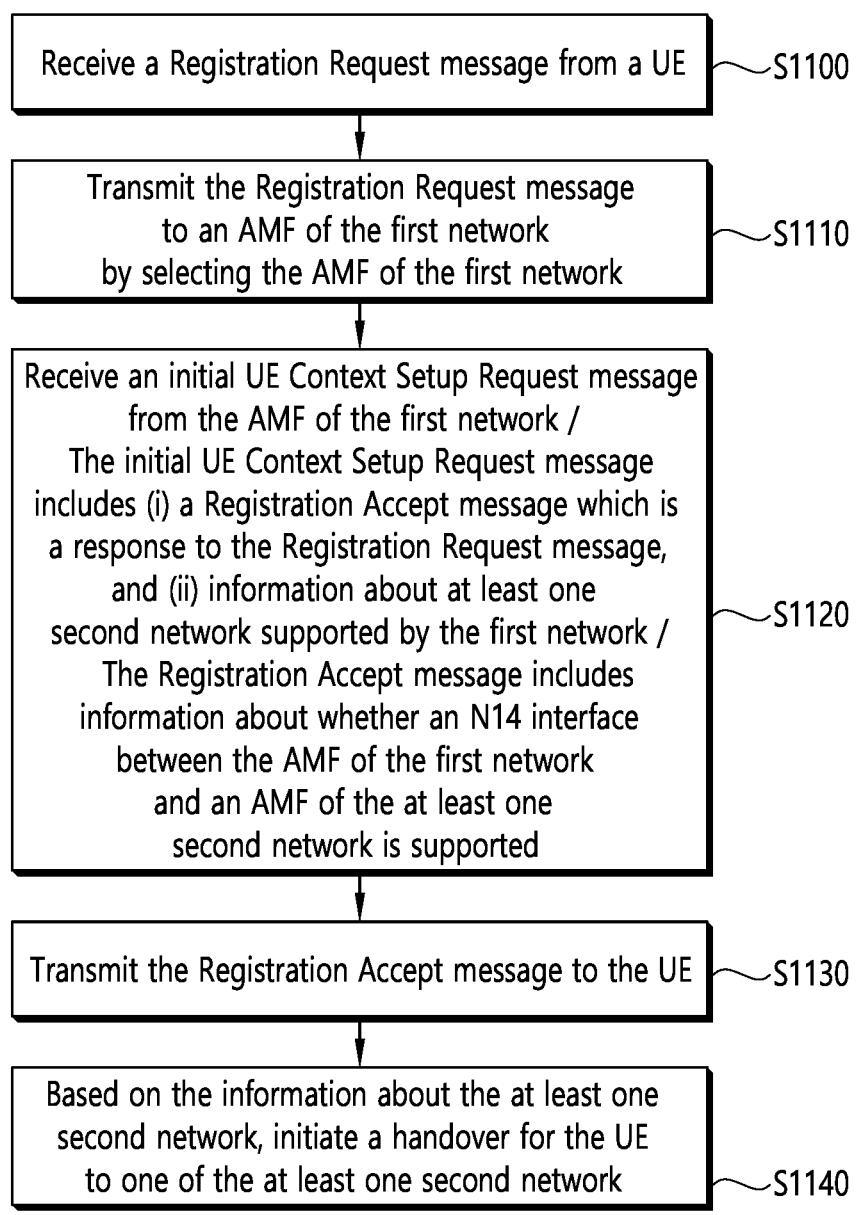
FIG. 11 shows an example of a method performed by a NG-RAN node of a first network to which implementations of the present disclosure is applied.

FIG. 11 shows an example of a method performed by a NG-RAN node of a first network to which implementations of the present disclosure is applied.

In step S1100, the NG-RAN node of the first network receives a Registration Request message from the UE.

In some implementations, the Registration Request message may include preferred network list information. The preferred network list information includes at least one of an ID of a network with which the UE can register and/or a priority of a network with which the UE can register. Or, the preferred network list information may include at least one of an ID of a network that has signed an SLA with the first network and/or a priority of a network that has signed an SLA with the first network.

In step S1110, the NG-RAN node of the first network transmits the Registration Request message to an AMF of the first network by selecting the AMF of the first network.

In step S1120, the NG-RAN node of the first network receives an initial UE Context Setup Request message from the AMF of the first network. The initial UE Context Setup Request message includes (i) a Registration Accept message which is a response to the Registration Request message, and (ii) information about at least one second network supported by the first network. In addition, the Registration Accept message includes information about whether an N14 interface between the AMF of the first network and an AMF of the at least one second network is supported.

In some implementations, the at least one second network may be determined by the AMF based on at least one of preferred network list information, subscriber information obtained by the AMF from a UDM, the presence or absence of the N14 interface between the AMF of the first network and the AMF of the at least one second network, an SLA between the first network and the at least one second network. In this case, the at least one second network may be a network included in the preferred network list information.

In some implementations, the Registration Accept message may include information about the at least one second network supported by the first network.

In some implementations, the initial UE Context Setup Request message may include information about a mobility mode used when the UE moves to the at least one second network.

In step S1130, the NG-RAN node of the first network transmits the Registration Accept message to the UE.

In step S1140, the NG-RAN node of the first network, based on the information about the at least one second network, initiates a handover for the UE to one of the at least one second network.

In some implementations, the first network may be a PLMN, and the at least one second network may be an SNPN. Or, the first network may be an SNPN, and the at least one second network may be a PLMN.

Furthermore, the method in perspective of the NG-RAN node of the first network described above in FIG. 11 may be performed by the second wireless device 200 shown in FIG. 2 and/or the wireless device 200 shown in FIG. 3.

More specifically, the NG-RAN node of the first network comprises at least one transceiver, at least one processor, and at least one memory operably connectable to the at least one processor. The at least one memory stores instructions to cause the at least one processor to perform operations below.

The operations comprise receiving a Registration Request message from the UE.

The operations comprise transmitting the Registration Request message to an AMF of the first network by selecting the AMF of the first network.

The operations comprise receiving an initial UE Context Setup Request message from the AMF of the first network. The initial UE Context Setup Request message includes (i) a Registration Accept message which is a response to the Registration Request message, and (ii) information about at least one second network supported by the first network. In addition, the Registration Accept message includes information about whether an N14 interface between the AMF of the first network and an AMF of the at least one second network is supported.

The operations comprise transmitting the Registration Accept message to the UE.

The operations comprise, based on the information about the at least one second network, initiating a handover for the UE to one of the at least one second network.

Figure 12:
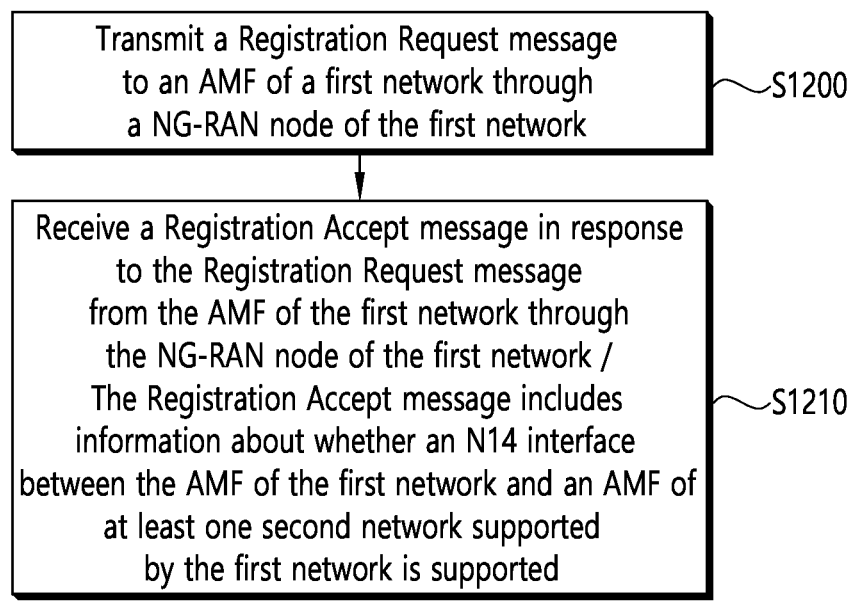
FIG. 12 shows an example of a method performed by a UE to which implementations of the present disclosure is applied.

FIG. 12 shows an example of a method performed by a UE to which implementations of the present disclosure is applied.

In step S1200, the UE transmits a Registration Request message to an AMF of a first network through a NG-RAN node of the first network.

In some implementations, the Registration Request message may include preferred network list information. The preferred network list information includes at least one of an ID of a network with which the UE can register and/or a priority of a network with which the UE can register. Or, the preferred network list information may include at least one of an ID of a network that has signed an SLA with the first network and/or a priority of a network that has signed an SLA with the first network.

In step S1210, the UE receives a Registration Accept message in response to the Registration Request message from the AMF of the first network through the NG-RAN node of the first network. The Registration Accept message includes information about whether an N14 interface between the AMF of the first network and an AMF of at least one second network supported by the first network is supported.

In some implementations, the Registration Accept message may include information about the at least one second network supported by the first network.

In some implementations, based on the information indicating that the N14 interface between the AMF of the first network and the AMF of the at least one second network is supported, the UE may perform a handover from the first network to one of the at least one second network.

In some implementations, based on the information indicating that the N14 interface between the AMF of the first network and the AMF of the at least one second network is not supported, the UE may establish a PDU session through a N3IWF of the first network, and perform a handover of the PDU session to one of the at least one second network. In this case, a request type for establishing the PDU session may be "Existing PDU Session".

In some implementations, the UE may communicate with at least one of a mobile device, a network and/or an autonomous vehicle other than the UE.

Furthermore, the method in perspective of the UE described above in FIG. 12 may be performed by the first wireless device 100 shown in FIG. 2, the wireless device 100 shown in FIG. 3, and/or the UE 100 shown in FIG. 4.

More specifically, the UE comprises at least one transceiver, at least one processor, and at least one memory operably connectable to the at least one processor. The at least one memory stores instructions to cause the at least one processor to perform operations below.

The operations comprise transmitting a Registration Request message to an AMF of a first network through a NG-RAN node of the first network.

In some implementations, the Registration Request message may include preferred network list information. The preferred network list information includes at least one of an ID of a network with which the UE can register and/or a priority of a network with which the UE can register. Or, the preferred network list information may include at least one of an ID of a network that has signed an SLA with the first network and/or a priority of a network that has signed an SLA with the first network.

The operations comprise receiving a Registration Accept message in response to the Registration Request message from the AMF of the first network through the NG-RAN node of the first network. The Registration Accept message includes information about whether an N14 interface between the AMF of the first network and an AMF of at least one second network supported by the first network is supported.

In some implementations, the Registration Accept message may include information about the at least one second network supported by the first network.

In some implementations, based on the information indicating that the N14 interface between the AMF of the first network and the AMF of the at least one second network is supported, the operations may further comprise performing a handover from the first network to one of the at least one second network.

In some implementations, based on the information indicating that the N14 interface between the AMF of the first network and the AMF of the at least one second network is not supported, the operations may further comprise establishing a PDU session through a N3IWF of the first network, and performing a handover of the PDU session to one of the at least one second network. In this case, a request type for establishing the PDU session may be "Existing PDU Session".

Furthermore, the method in perspective of the UE described above in FIG. 12 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, an apparatus operating in a wireless communication system comprises at least one processor, and at least one memory operably connectable to the at least one processor. The at least one processor is adapted to perform operations comprising: generating a Registration Request message, and obtaining a Registration Accept message in response to the Registration Request message. The Registration Accept message includes information about whether an N14 interface between an AMF of a first network and an AMF of at least one second network supported by the first network is supported.

Furthermore, the method in perspective of the UE described above in FIG. 12 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, CRM stores instructions to cause at least one processor to perform operations. The operations comprise: generating a Registration Request message, and obtaining a Registration Accept message in response to the Registration Request message. The Registration Accept message includes information about whether an N14 interface between an AMF of a first network and an AMF of at least one second network supported by the first network is supported.

Various implementations and/or embodiments of the present disclosure will be described below.

In the embodiments to be described below, it is assumed that a specific PLMN has established an SLA with another SNPN, and an N14 interface exists between AMFs of the PLMN and the SNPN in which the SLA has been established, depending on the network configuration situation of the operator.

The embodiments described below can support service continuity in all cases when the UE moves from PLMN to SNPN, or when the UE moves from SNPN to PLMN, or when the UE moves between SNPNs.

1. Embodiment 1: Ensure Service Continuity Between PLMN and SNPN

Embodiment 1 of the present disclosure provides, in order to ensure service continuity between the PLMN and the SNPN, a method of informing the UE of whether the N14 interface between two networks is supported.

According to some implementations of Embodiment 1 of the present disclosure, in the process of the UE registering with a source network or establishing a PDU session, the source network may provide the UE with a list of target networks for which the corresponding source network currently has an N14 interface through the SLA. In addition, according to some implementations of Embodiment 1 of the present disclosure, the source network may provide the UE with information that the UE should perform a PDU session establishment procedure using "existing PDU session" as a request type after the UE moves to the target network.

Figure 13:
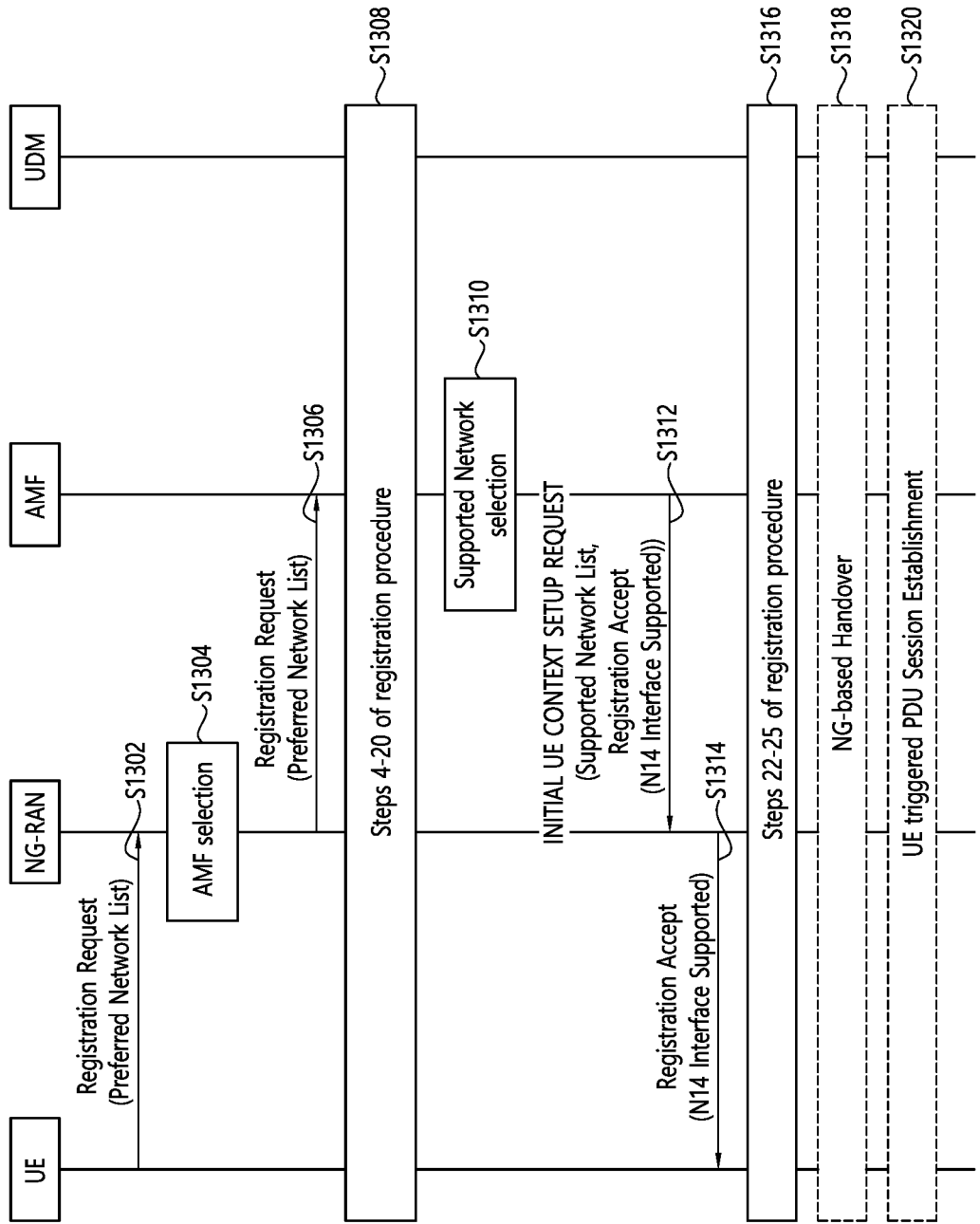
FIG. 13 shows an example of a method for ensuring service continuity between a PLMN and a SNPN to which implementations of the present disclosure is applied.

FIG. 13 shows an example of a method for ensuring service continuity between a PLMN and a SNPN to which implementations of the present disclosure is applied.

The example shown in FIG. 13 is an example illustrating the method described in FIGS. 11 and 12 from the perspective of the entire system.

(1) Step S1302: To register with the network, the UE transmits a Registration Request message to the NG-RAN. This step corresponds to step 1 of the registration procedure described in FIG. 6. Also, this step corresponds to step S1100 described in FIG. 11 and/or step S1200 described in FIG. 12.

The Registration Request message may include a preferred network list. The preferred network list may include IDs (e.g., PLMN IDs and/or combinations of PLMN IDs and NIDs) of other networks with which the UE can currently register and/or priority information of the corresponding networks. When there are several other networks with which the UE can register, service continuity to the network having the highest priority may be considered first.

Alternatively, the network ID and/or priority information of the SNPN that has established an SLA with the PLMN may be pre-configured in the UE. For example, when the UE registers with the PLMN, the preferred network list may include the SNPN ID (e.g., a combination of PLMN ID and NID) that has established an SLA with the corresponding PLMN and/or priority information of the corresponding SNPN. For example, when the UE registers with the SNPN, the preferred network list may include the PLMN ID (e.g., PLMN ID and/or a combination of PLMN ID and NID) that has established an SLA with the corresponding SNPN and/or priority information of the corresponding PLMN. If the UE does not know whether there is an SLA between the PLMN and the SNPN, the preferred network list may include only information about networks with which the UE can register regardless of the SLA. In this case, the network may perform handover with preference to a network having an SLA among the preferred network list.

The network ID and/or priority information of the SNPN that has established an SLA with the PLMN pre-configured in the UE may be updated through a UE configuration update procedure.

(2) Step S1304: The NG-RAN selects the AMF. This step corresponds to step 2 of the registration procedure described in FIG. 6. Also, this step corresponds to step S1110 described in FIG. 11.

The NG-RAN may select the AMF based on 5G-S-TMSI and/or GUAMI. 5G-S-TMSI and/or GUAMI may be received by being included in the Registration Request message transmitted by the UE. If the 5G-S-TMSI and/or GUAMI is not included in the Registration Request message transmitted by the UE or is invalid, the NG-RAN may select the AMF based on the Requested NSSAI, etc. If it is difficult to select an appropriate AMF, the NG-RAN may select a default AMF based on information configured in the NG-RAN.

(3) Step S1306: The NG-RAN delivers the Registration Request message received from the UE to the selected AMF. This step corresponds to step 3 of the registration procedure described in FIG. 6. Also, this step corresponds to step S1110 described in FIG. 11 and/or step S1200 described in FIG. 12.

(4) Step S1308: Steps 4-20 of the registration procedure described in FIGS. 6 and 7 are performed.

(5) Step S1310: If the AMF can accept the UE's registration request, the AMF may determine the available (or supported) network list for the UE based on the preferred network list received from the UE, subscriber information received from the UDM, the presence or absence of N14 interface between the AMF of SNPN, SLA, etc. The AMF may include ID of the corresponding network in the supported network list.

The available (or supported) network list for the UE determined by the AMF may be determined within the preferred network list received from the UE. For example, when the UE registers with the PLMN, the AMF may include the SNPN ID, from among the preferred networks list, for which the current PLMN can support service continuity for the UE in the supported network list. For example, when the UE registers with the SNPN, the AMF may include the PLMN ID, from among the preferred networks list, for which the current SNPN can support service continuity for the UE in the supported network list.

It may be assumed that the information about whether the N14 interface exists between AMFs of the PLMN and the SNPN in which the SLA has been established is pre-configured in the AMF. Alternatively, information about whether the N14 interface exists between AMFs of the PLMN and the SNPN in which the SLA has been established may be pre-configured in the NG-RAN, and when the SLA exists, an Xn interface may exist between the two networks.

Step S1310 may be performed immediately after the AMF retrieves the subscriber information from the UDM.

The AMF may determine a mobility mode to be used when the UE moves to another network instead of and/or together with the supported network list. The mobility mode may indicate any one of handover, N3IWF-based interworking, and LBO PDU session establishment.

When there is a PDU session currently active (i.e., an established PDU session), the AMF may determine a mobility mode for each PDU session. For example, when two PDU sessions (e.g., PDU session A and PDU session B) are active, the AMF may determine the mobility mode as N3IWF-based interworking for the PDU session A and the mobility mode as handover for the PDU session B.

The AMF may determine the mobility mode differently for each UE or for each activated PDU session of the UE according to a target network to which the UE can move. For example, the AMF may determine the mobility mode for each UE according to the target network as follows.

UE-1, PLMN-1: Xn-based or NG-based handover
UE-1, SNPN-2: N3IWF-based interworking
UE-2, PLMN-1: LBO PDU session establishment
UE-2, SNPN-2: Xn-based or NG-based handover For example, the AMF may determine the mobility mode for each activated PDU session according to the target network as follows.

UE-1, PDU Session A, PLMN-1: Xn-based or NG-based handover
UE-1, PDU Session A, SNPN-2: N3IWF-based interworking
UE-1, PDU Session B, PLMN-1: N3IWF-based interworking
UE-1, PDU session B, SNPN-2: LBO PDU session establishment The AMF may transmit information about the mobility mode determined according to the corresponding situation to the NG-RAN and/or the UE through procedures such as initial registration, mobility registration, PDU session establishment, and/or PDU session modification. For example, whether the generated PDU session is made with LBO or home routed (HR) may be considered.

Alternatively, the AMF may only determine whether handover can be used when the UE or an activated PDU session is moved to another network, instead of the supported network list and/or mobility mode.

(6) Step S1312: The AMF transmits an initial context setup request (NGAP INITIAL CONTEXT SETUP REQUEST) message to the NG-RAN to create a UE context in the NG-RAN. This step corresponds to step 21 of the registration procedure described in FIG. 7. Also, this step corresponds to step S1120 described in FIG. 11 and/or step S1210 described in FIG. 12.

The initial context setup request message may include a supported network list determined by the AMF. The NG-RAN may trigger NG handover using the N14 interface for a network included in the supported network list. The NG-RAN may instruct/configure measurement for connected mode mobility by using an RRC message to the UE based on the supported network list.

The initial context setup request message may include a Registration Accept message that is a response to the Registration Request message. The Registration Accept message may include a "5GS network Feature Support" indicator. The 5GS network Feature Support indicator may include an "N14 Interface Supported" indicator to inform the UE of whether the N14 interface is supported between AMFs of the PLMN and the SNPN. The 5GS network Feature Support indicator and the N14 Interface Supported indicator are only names and may be replaced with other names.

Instead of the initial context setup request message, a DL NAS transfer (DOWNLINK NAS TRANSPORT) message may be used.

(7) Step S1314: The NG-RAN delivers the Registration Accept message received from the AMF to the UE. This step corresponds to step 21 of the registration procedure described in FIG. 7. Also, this step corresponds to step S1130 described in FIG. 11 and/or step S1210 described in FIG. 12.

Upon receiving the Registration Acceptance message, the UE may know whether service continuity through the N14 interface can be guaranteed with the network that has established an SLA with the currently registered network through the N14 Interface Supported indicator.

Due to the network configuration of the operator, the network with which the UE currently registers may have an N14 interface with some of the networks for which an SLA has been established, but may not have an N14 interface with other networks.

In this case, the AMF of the currently registered network may transmit the Registration Accept message by additionally including a supported network list. In this case, the UE may know which network from among networks that have established an SLA with the currently registered network can ensure service continuity through the N14 interface by considering both the N14 Interface Supported indicator and the supported network list.

(8) Step S1316: Steps 22-25 of the registration procedure described in FIG. 7 are performed.

(9) Step S1318/S1320: When the UE moves to another network while maintaining the PDU session being serviced in the currently registered network, the following operation may be performed based on the information received in step S1312/S1314.

Step S1318: When the UE moves to a network for which the N14 interface with the currently registered network exists and which is included in the supported network list, the NG-RAN may trigger an NG-based handover to the AMF of the source network. This corresponds to step S1140 described in FIG. 11. When requesting a handover, the NG-RAN may include a target network ID (e.g., a PLMN ID and/or a combination of a PLMN ID and an NID). Upon receiving the handover request, the AMF of the source network may request a handover together with the UE context to the AMF of the target network through the N14 interface to ensure service continuity for the UE.

Step S1320: When the UE moves to a network for which the N14 interface with the currently registered network does not exist, the UE may perform a PDU session establishment procedure through the N3IWF. That is, the UE may select an N3IWF of a network to which the corresponding PDU session is anchored, perform registration, establish a PDU session, and perform handover for the corresponding PDU session. In order to inform that the PDU session was existing while establishing the PDU session, the PDU Session Establishment Request message may include a request type set to "existing PDU session" and a PDU session ID to perform handover. In this process, a PDU session to be subjected to handover may be selected in consideration of the mobility mode received from the network. The PDU session establishment procedure through the N3IWF may follow the PDU session establishment procedure described in FIGS. 8 and 9 and S4.9.2 of 3GPP TS 23.502.

Figure 14:
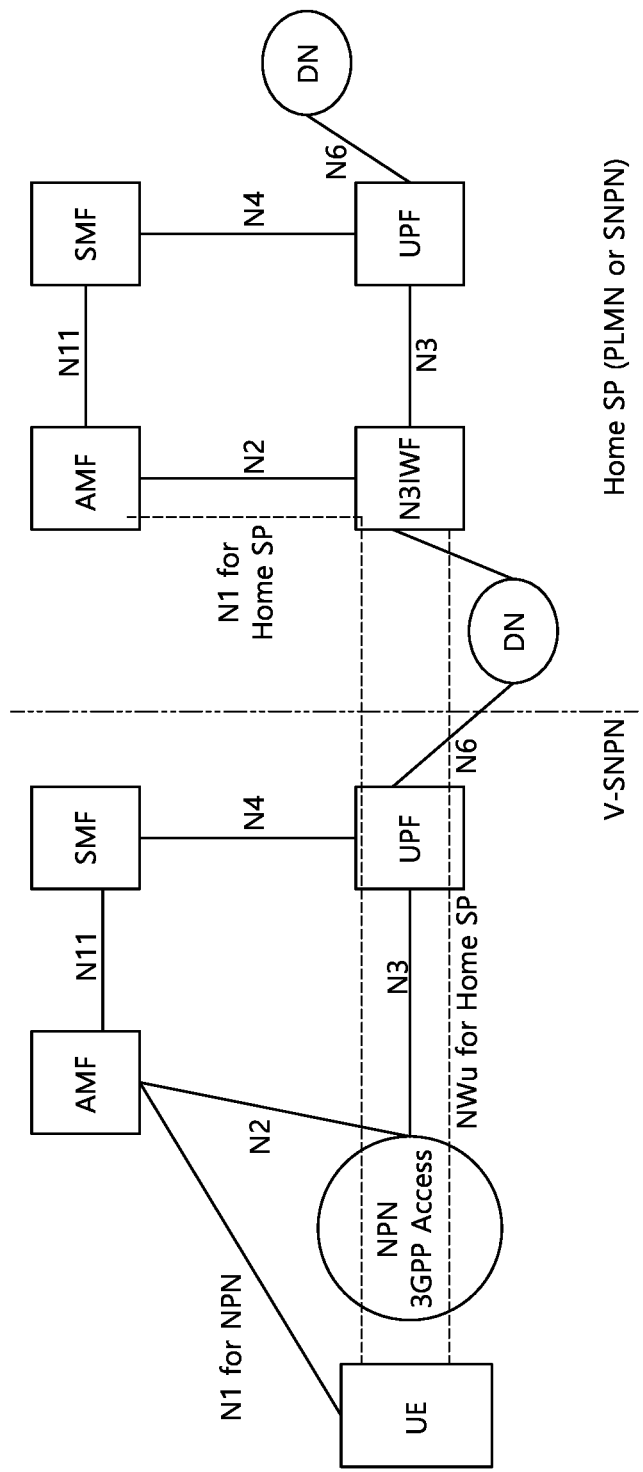
FIG. 14 shows an example of a situation in which a PDU establishment procedure and handover are performed through the N3IWF to which implementations of the present disclosure is applied.

FIG. 14 shows an example of a situation in which a PDU establishment procedure and handover are performed through the N3IWF to which implementations of the present disclosure is applied.

Referring to FIG. 14, when the UE moves from a home service provider (SP) to a visited SNPN (V-SNPN) or changes a V-SNPN (e.g., V-SNPN-1→V-SNPN-2), a PDU session establishment procedure may be performed through the N3IWF of the home SP for the HR PDU session anchored in the home SP.

Figure 15:
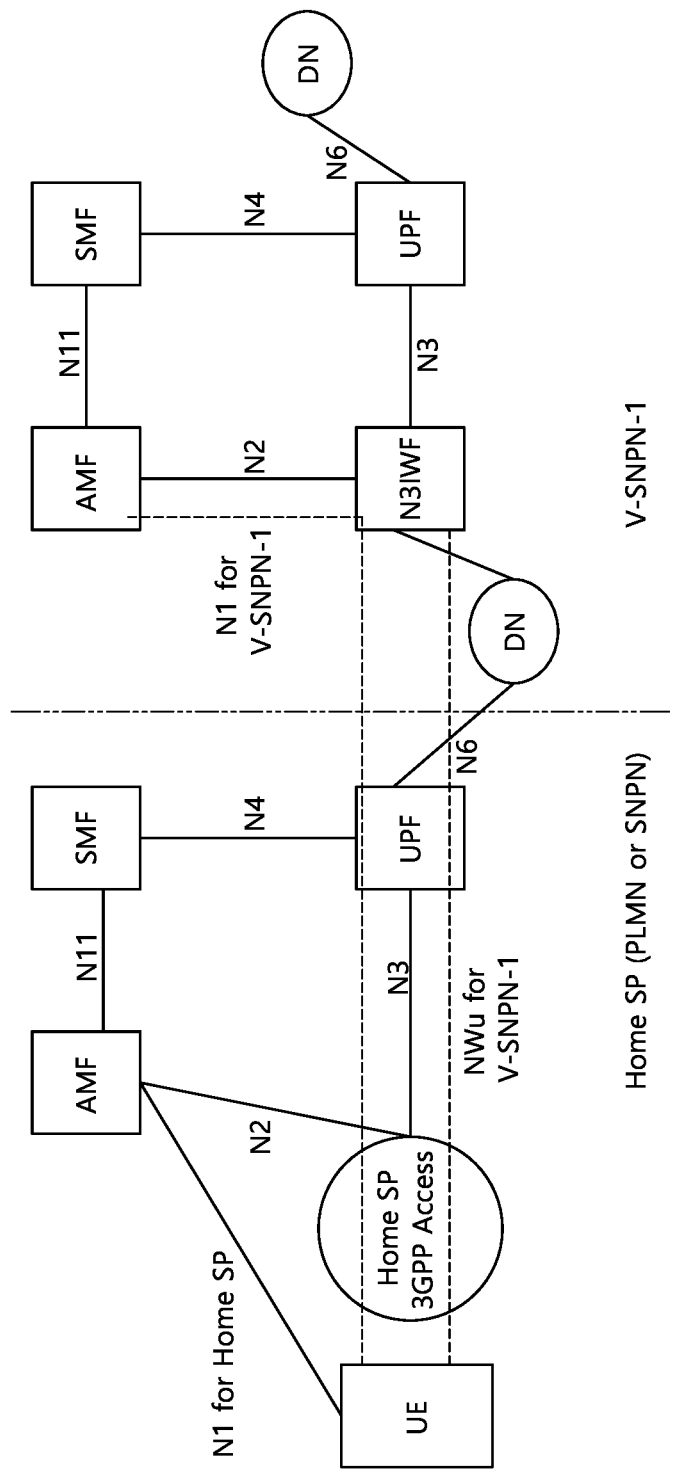
FIG. 15 shows another example of a situation in which a PDU establishment procedure and handover are performed through the N3IWF to which implementations of the present disclosure is applied.

FIG. 15 shows another example of a situation in which a PDU establishment procedure and handover are performed through the N3IWF to which implementations of the present disclosure is applied.

Referring to FIG. 15, when the UE moves from the V-SNPN to the home SP, a PDU session establishment procedure may be performed through the N3IWF of the V-SNPN for the LBO PDU session anchored in the V-SNPN.

Figure 16:
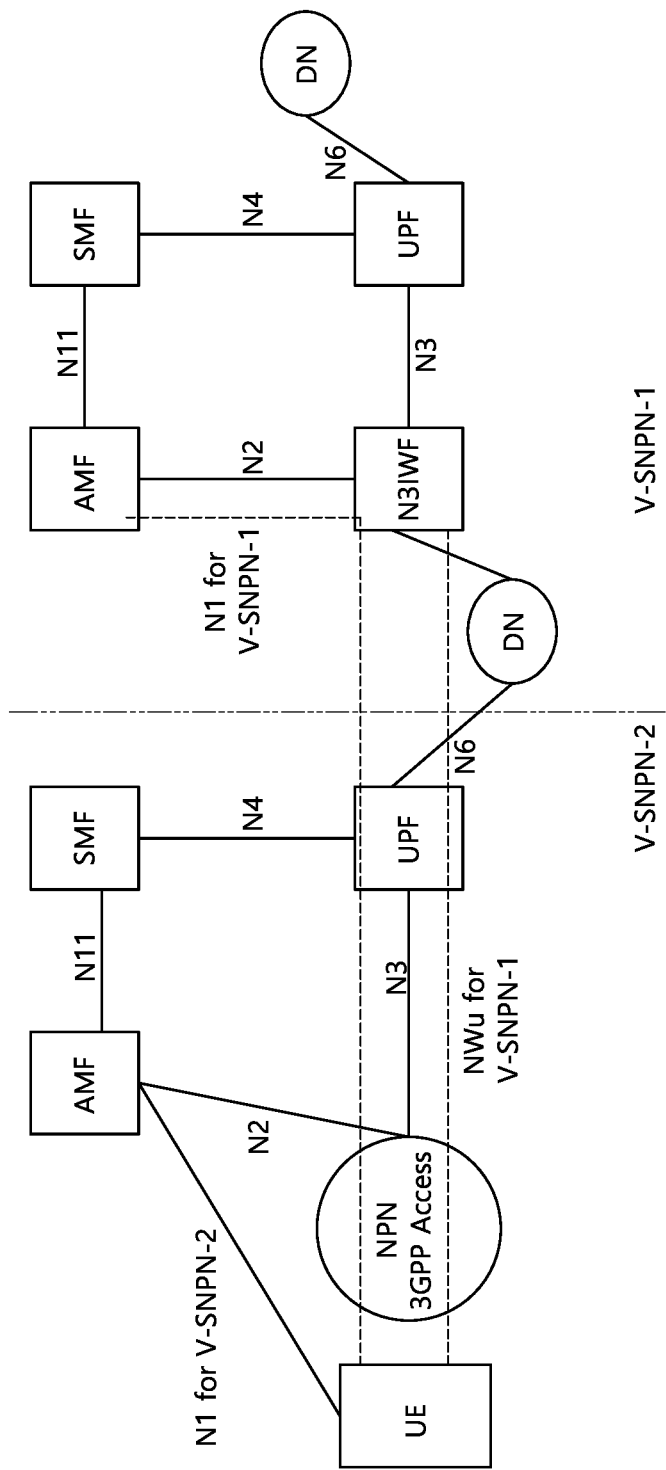
FIG. 16 shows another example of a situation in which a PDU establishment procedure and handover are performed through the N3IWF to which implementations of the present disclosure is applied.

FIG. 16 shows another example of a situation in which a PDU establishment procedure and handover are performed through the N3IWF to which implementations of the present disclosure is applied.

Referring to FIG. 16, when the UE changes V-SNPN (e.g., V-SNPN-1→V-SNPN-2), the PDU session establishment procedure may be performed through the N3IWF of the V-SNPN-1 for LBO PDU session anchored in the V-SNPN-1

Meanwhile, in FIG. 13, it is assumed that the information about the SNPN that has established an SLA with the PLMN is pre-configured in the UE, but the information about the SNPN that has established an SLA with the PLMN may be configured in the UDM, instead of the UE. In this case, the UE may not include the preferred network list in the Registration Request message. Instead, the AMF that receives the Registration Request message from the UE may receive information (e.g., network ID) about the SNPN that has established an SLA with the PLMN from the UDM, and perform the operation of step S1310. Alternatively, only information about a network with which the UE can register may be stored in the UDM, and information about a network with which an SLA has been established may be configured in the AMF. In this case, the AMF may consider whether an SLA has been established when determining a supported network list. Alternatively, the AMF may determine a supported network list based only on information about a network with which an SLA has been established, regardless of subscriber information.

According to Embodiment 1 of the present disclosure described above, when the NG-RAN of the source network triggers handover to the target network, it is possible to reduce unnecessary handover attempts by referring to the existence of the N14 interface. In addition, when the UE moves to a target network where the N14 interface does not exist, based on the information provided from the source network, subsequent operations (e.g., PDU session establishment procedure using "existing PDU session" as the request type) can be quickly executed, thereby guaranteeing service continuity to users.

2. Embodiment 2: Ensure Service Continuity Between PLMN and SNPN Based on NG Setup Procedure Embodiment 2 of the present disclosure provides, in order to ensure service continuity between the PLMN and the SNPN, a method of informing the UE of whether the N14 interface between two networks based on NG setup procedure.

Figure 17:
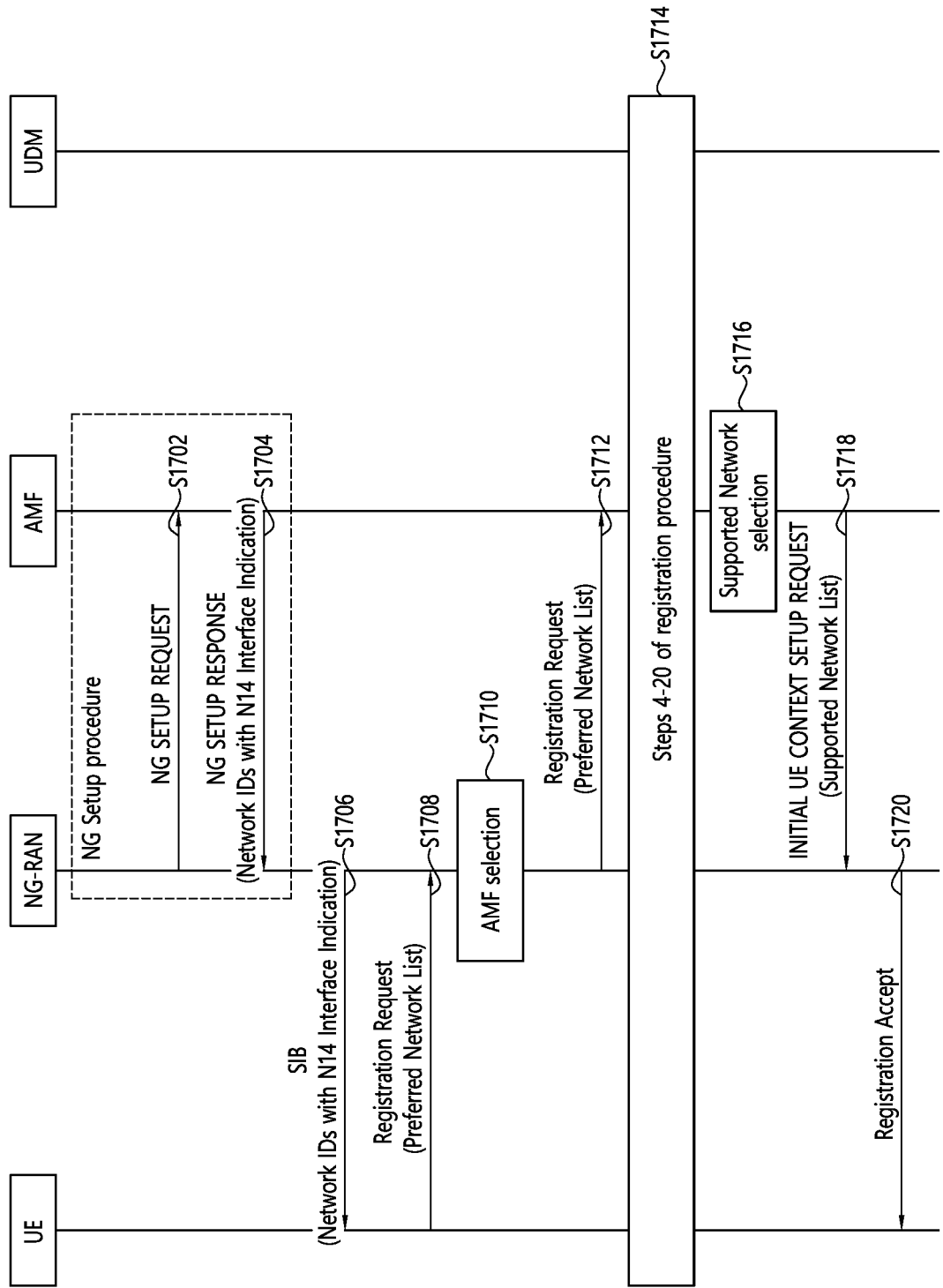
FIG. 17 shows an example of a method for ensuring service continuity between a PLMN and a SNPN based on an NG setup procedure to which implementations of the present disclosure is applied.

FIG. 17 shows an example of a method for ensuring service continuity between a PLMN and a SNPN based on an NG setup procedure to which implementations of the present disclosure is applied.

(1) Step S1702: The NG-RAN transmits a NG Setup Request message to the AMF to establish the NG interface with the AMF.

(2) Step S1704: The AMF transmits an NG Setup Response message, which is a response to the NG Setup Request message, to the NG-RAN.

The NG Setup Response message may include a "Network IDs with N14 interface indication" information element (IE). The Network IDs with N14 interface indication IE may indicate a list of IDs (e.g., a PLMN ID and/or a combination of a PLMN ID and an NID) of a network with which the AMF has established an SLA. The Network IDs with N14 interface indication IE may include information about whether the corresponding AMF has an N14 interface with an individual network. The Network IDs with N14 interface indication IE are only names, and may be replaced with other names.

It may be assumed that the information about whether the N14 interface exists between AMFs of the PLMN and the SNPN in which the SLA has been established is pre-configured in the AMF. Alternatively, information about whether the N14 interface exists between AMFs of the PLMN and the SNPN in which the SLA has been established may be pre-configured in the NG-RAN, and when the SLA exists, an Xn interface may exist between the two networks.

(3) Step S1706: The NG-RAN delivers the Network IDs with N14 interface indication IE received from the AMF to the UE through a system information block (SIB).

Due to the network configuration of the operator, the network with which the UE is currently registered may have an N14 interface with some of the networks for which an SLA has been established, but may not have an N14 interface with other networks. In this case, by considering the Network IDs with N14 interface indication IE, the UE may know which network from among networks that have established an SLA with the currently registered network can ensure service continuity through the N14 interface. Accordingly, the UE may determine a subsequent operation (e.g., NG-based handover or PDU session establishment procedure).

In addition, a supported network list determined by the AMF may be included in the Registration Accept message transmitted in step S1716 to be described later. In this case, the UE may also consider the supported network list and may know which network from among networks that have established an SLA with the currently registered network can ensure service continuity through the N14 interface. Accordingly, the UE may determine a subsequent operation (e.g., NG-based handover or PDU session establishment procedure).

(4) Step S1708: To register with the network, the UE transmits a Registration Request message to the NG-RAN. This step corresponds to step 1 of the registration procedure described in FIG. 6.

The Registration Request message may include a preferred network list. The preferred network list may include IDs (e.g., PLMN IDs and/or combinations of PLMN IDs and NIDs) of other networks with which the UE can currently register, from among network IDs belonging to the Network IDs with N14 interface indication IE received through the SIB, and/or priority information of the corresponding networks. When there are several other networks with which the UE can register, service continuity to the network having the highest priority may be considered first.

Alternatively, the network ID and/or priority information of the SNPN that has established an SLA with the PLMN may be pre-configured in the UE. In this case, a preferred network list may be configured in consideration of both information pre-configured in the UE and information received through the SIB. For example, when the UE registers with the PLMN, the preferred network list may include the SNPN ID (e.g., a combination of PLMN ID and NID) that has established an SLA with the corresponding PLMN, from among network IDs belonging to the Network IDs with N14 interface indication IE, and/or priority information of the corresponding SNPN. For example, when the UE registers with the SNPN, the preferred network list may include the PLMN ID (e.g., PLMN ID and/or a combination of PLMN ID and NID) that has established an SLA with the corresponding SNPN, from among network IDs belonging to the Network IDs with N14 interface indication IE, and/or priority information of the corresponding PLMN. If the UE does not know whether there is an SLA between the PLMN and the SNPN, the preferred network list may include only information about networks with which the UE can register, from among network IDs belonging to the Network IDs with N14 interface indication IE, regardless of the SLA. In this case, the network may perform handover with preference to a network having an SLA among the preferred network list.

The network ID and/or priority information of the SNPN that has established an SLA with the PLMN pre-configured in the UE may be updated through a UE configuration update procedure.

(5) Step S1710: The NG-RAN selects the AMF. This step corresponds to step 2 of the registration procedure described in FIG. 6.

The NG-RAN may select the AMF based on 5G-S-TMSI and/or GUAMI. 5G-S-TMSI and/or GUAMI may be received by being included in the Registration Request message transmitted by the UE. If the 5G-S-TMSI and/or GUAMI is not included in the Registration Request message transmitted by the UE or is invalid, the NG-RAN may select the AMF based on the Requested NSSAI, etc. If it is difficult to select an appropriate AMF, the NG-RAN may select a default AMF based on information configured in the NG-RAN.

(6) Step S1712: The NG-RAN delivers the Registration Request message received from the UE to the selected AMF. This step corresponds to step 3 of the registration procedure described in FIG. 6.

(7) Step S1714: Steps 4-20 of the registration procedure described in FIGS. 6 and 7 are performed.

(8) Step S1716: If the AMF can accept the UE's registration request, the AMF may determine the available (or supported) network list for the UE based on the preferred network list received from the UE, subscriber information received from the UDM, the presence or absence of N14 interface between the AMF of SNPN, SLA, etc. The AMF may include ID of the corresponding network in the supported network list.

The available (or supported) network list for the UE determined by the AMF may be determined within the preferred network list received from the UE. For example, when the UE registers with the PLMN, the AMF may include the SNPN ID, from among the preferred networks list, for which the current PLMN can support service continuity for the UE in the supported network list. For example, when the UE registers with the SNPN, the AMF may include the PLMN ID, from among the preferred networks list, for which the current SNPN can support service continuity for the UE in the supported network list.

Step S1716 may be performed immediately after the AMF retrieves the subscriber information from the UDM.

The AMF may determine a mobility mode to be used when the UE moves to another network instead of and/or together with the supported network list. The mobility mode may indicate any one of handover, N3IWF-based interworking, and LBO PDU session establishment.

When there is a PDU session currently active (i.e., an established PDU session), the AMF may determine a mobility mode for each PDU session. For example, when two PDU sessions (e.g., PDU session A and PDU session B) are active, the AMF may determine the mobility mode as N3IWF-based interworking for the PDU session A and the mobility mode as handover for the PDU session B.

The AMF may determine the mobility mode differently for each UE or for each activated PDU session of the UE according to a target network to which the UE can move. For example, the AMF may determine the mobility mode for each UE according to the target network as follows.

UE-1, PLMN-1: Xn-based or NG-based handover
UE-1, SNPN-2: N3IWF-based interworking
UE-2, PLMN-1: LBO PDU session establishment
UE-2, SNPN-2: Xn-based or NG-based handover For example, the AMF may determine the mobility mode for each activated PDU session according to the target network as follows.

UE-1, PDU Session A, PLMN-1: Xn-based or NG-based handover
UE-1, PDU Session A, SNPN-2: N3IWF-based interworking
UE-1, PDU Session B, PLMN-1: N3IWF-based interworking
UE-1, PDU session B, SNPN-2: LBO PDU session establishment The AMF may transmit information about the mobility mode determined according to the corresponding situation to the NG-RAN and/or the UE through procedures such as initial registration, mobility registration, PDU session establishment, and/or PDU session modification. For example, whether the generated PDU session is made with LBO or HR may be considered.

Alternatively, the AMF may only determine whether handover can be used when the UE or an activated PDU session is moved to another network, instead of the supported network list and/or mobility mode.

(9) Step S1718: The AMF transmits an initial context setup request message to the NG-RAN to create a UE context in the NG-RAN. This step corresponds to step 21 of the registration procedure described in FIG. 7.

The initial context setup request message may include a Registration Accept message that is a response to the Registration Request message. The initial context setup request message may include a supported network list determined by the AMF. The NG-RAN may trigger NG handover using the N14 interface for a network included in the supported network list. The NG-RAN may instruct/configure measurement for connected mode mobility by using an RRC message to the UE based on the supported network list.

The information transmitted to the NG-RAN may be transmitted only when an update is required for the information transmitted in step S1704. For example, an update may be required and the information may be transmitted to the NG-RAN, when, although there is an N14 interface, but the UE does not have a subscription to a specific SNPN or PLMN, so a handover to the corresponding network should not be performed.

Instead of the initial context setup request message, a DL NAS transfer message may be used.

(10) Step S1720: The NG-RAN delivers the Registration Accept message received from the AMF to the UE. This step corresponds to step 21 of the registration procedure described in FIG. 7.

Upon receiving the Registration Accept message, the UE may know whether service continuity through the N14 interface can be guaranteed with the network that has established an SLA with the currently registered network.

Due to the network configuration of the operator, the network with which the UE currently registers may have an N14 interface with some of the networks for which an SLA has been established, but may not have an N14 interface with other networks. In this case, the AMF of the currently registered network may transmit the Registration Accept message by additionally including a supported network list. In this case, the UE may know which network from among networks that have established an SLA with the currently registered network can ensure service continuity through the N14 interface by considering both the N14 Interface Supported indicator and the supported network list.

Thereafter, steps 22-25 of the registration procedure described in FIG. 7 are performed. This step is not shown in FIG. 17.

Thereafter, when the UE moves to another network while maintaining the PDU session being serviced in the currently registered network, the following operation may be performed based on the information received in steps S1718/S1720. This step is not shown in FIG. 17.

When the UE moves to a network for which the N14 interface with the currently registered network exists and which is included in the supported network list, the NG-RAN may trigger an NG-based handover to the AMF of the source network.

When requesting a handover, the NG-RAN may include a target network ID (e.g., a PLMN ID and/or a combination of a PLMN ID and an NID). Upon receiving the handover request, the AMF of the source network may request a handover together with the UE context to the AMF of the target network through the N14 interface to ensure service continuity for the UE.

When the UE moves to a network for which the N14 interface with the currently registered network does not exist, the UE may perform a PDU session establishment procedure through the N3IWF. That is, the UE may select an N3IWF of a network to which the corresponding PDU session is anchored, perform registration, establish a PDU session, and perform handover for the corresponding PDU session. In order to inform that the PDU session was existing while establishing the PDU session, the PDU Session Establishment Request message may include a request type set to "existing PDU session" and a PDU session ID to perform handover. In this process, a PDU session to be subjected to handover may be selected in consideration of the mobility mode received from the network. The PDU session establishment procedure through the N3IWF may follow the PDU session establishment procedure described in FIGS. 8 and 9 and S4.9.2 of 3GPP TS 23.502.

Examples of a situation in which a PDU establishment procedure and handover are performed through the N3IWF may refer to FIGS. 14 to 16 described above.

Meanwhile, in FIG. 17, it is assumed that the information about the SNPN that has established an SLA with the PLMN is pre-configured in the UE, but the information about the SNPN that has established an SLA with the PLMN may be configured in the UDM, instead of the UE. In this case, the UE may not include the preferred network list in the Registration Request message. Instead, the AMF that receives the Registration Request message from the UE may receive information (e.g., network ID) about the SNPN that has established an SLA with the PLMN from the UDM, and perform the operation of step S1716. Alternatively, only information about a network with which the UE can register may be stored in the UDM, and information about a network with which an SLA has been established may be configured in the AMF. In this case, the AMF may consider whether an SLA has been established when determining a supported network list. Alternatively, the AMF may determine a supported network list based only on information about a network with which an SLA has been established, regardless of subscriber information.

According to Embodiment 2 of the present disclosure described above, the network may inform the UE of whether the N14 interface is supported in the registration procedure, and may support the UE to select a method for receiving service continuity support between the PLMN and the SNPN according to the network configuration situation. In addition, the NG-RAN can know the network configuration in advance and quickly move the UE to the target network by performing Xn-based handover or NG-based handover to the target network.

3. Embodiment 3: Service Continuity Between SNPNs in a Situation where Credentials are Owned by an Entity Separate from SNPN Embodiment 3 of the present disclosure provides a method in which a network guarantees service continuity to another network according to a network configuration situation, and at the same time does not cause unnecessary delay time to the UE.

Figure 18:
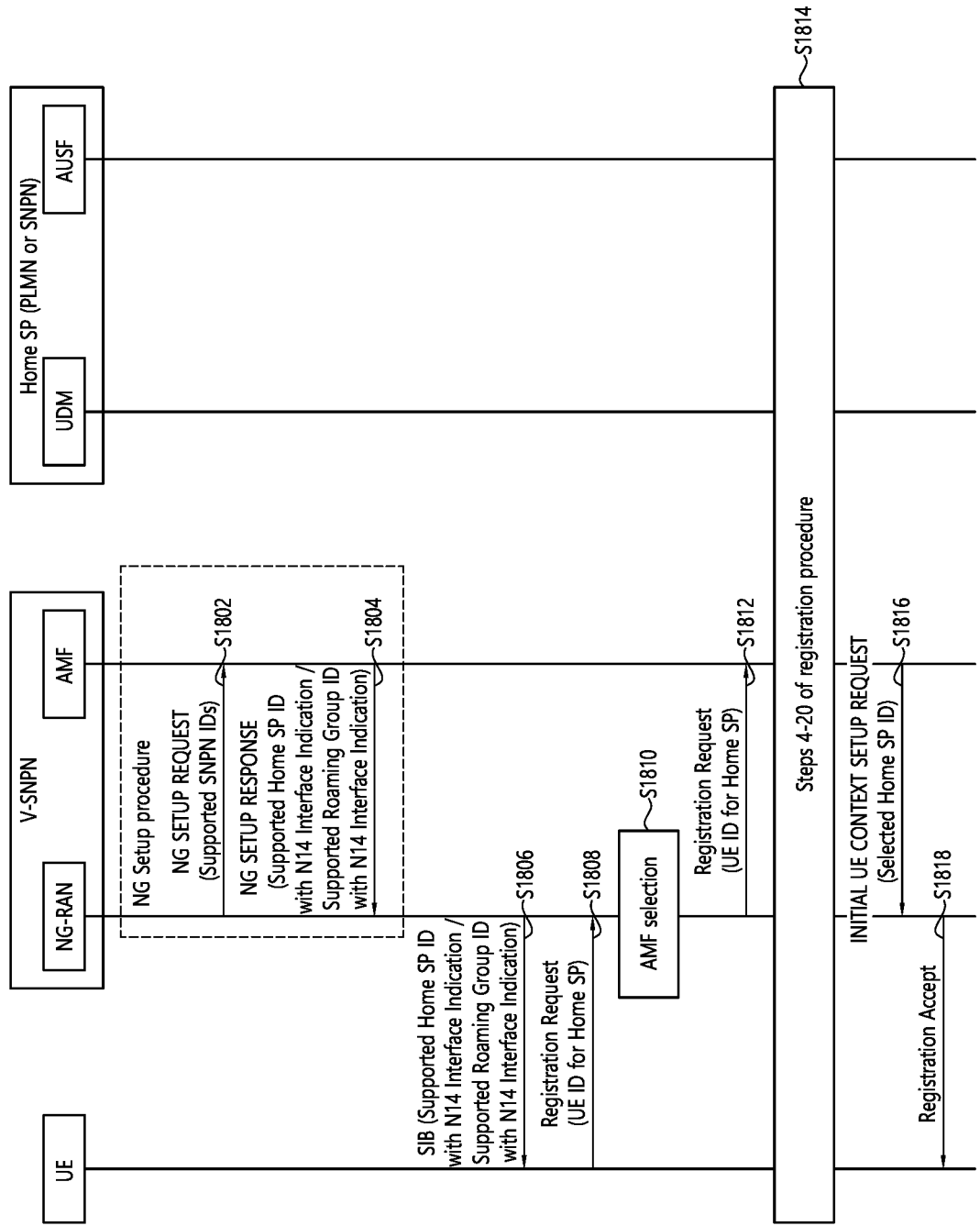
FIG. 18 shows an example of a method for informing a UE of whether an N14 interface is supported between a V-SNPN and a home SP to which implementations of the present disclosure is applied.

FIG. 18 shows an example for a method of informing a UE of whether an N14 interface is supported between a V-SNPN and a home SP to which implementations of the present disclosure is applied.

(1) Step S1802: The NG-RAN transmits a NG Setup Request message to the AMF to establish the NG interface with the AMF. The NG Setup Request message may include a list of supportable SNPNs.

(2) Step S1804: The AMF transmits an NG Setup Response message, which is a response to the NG Setup Request message, to the NG-RAN.

The NG Setup Response message may include a "Supported Home SP ID with N14 interface indication" IE. The Supported Home SP ID with N14 interface indication IE may indicate a list of IDs (e.g., a PLMN ID and/or a combination of a PLMN ID and an NID) of a network with which the AMF has established an SLA. The Supported Home SP ID with N14 interface indication IE may include information about whether the corresponding AMF has an N14 interface with an individual network. The Supported Home SP ID with N14 interface indication IE are only names, and may be replaced with other names.

The NG Setup Response message may also include a "Supported Roaming Group ID with N14 interface indication" IE. The roaming group is configured by dividing networks for which the AMF of the V-SNPN has established an SLA into several groups, and may be used to prevent broadcasting of all home SP IDs through the SIB. Accordingly, the Supported Roaming Group ID with N14 interface indication IE may indicate a list of groups of networks with which the AMF of the V-SNPN has established an SLA. The Supported Roaming Group ID with N14 interface indication IE may include information about whether the corresponding AMF has an N14 interface with a network belonging to a specific group. The Supported Roaming Group ID with N14 interface indication IE are only names, and may be replaced with other names.

It may be assumed that the information about whether the N14 interface exists between AMFs of the PLMN and the SNPN in which the SLA has been established is pre-configured in the AMF. Alternatively, information about whether the N14 interface exists between AMFs of the PLMN and the SNPN in which the SLA has been established may be pre-configured in the NG-RAN, and when the SLA exists, an Xn interface may exist between the two networks.

(3) Step S1806: The NG-RAN delivers the Supported Home SP ID with N14 interface indication IE and/or the Supported Roaming Group ID with N14 interface indication IE received from the AMF to the UE through the SIB.

Due to the network configuration of the operator, the network with which the UE is currently registered may have an N14 interface with some of the networks for which an SLA has been established, but may not have an N14 interface with other networks. In this case, by considering the Supported Home SP ID with N14 interface indication IE and/or the Supported Roaming Group ID with N14 interface indication IE, the UE may know which network from among networks that have established an SLA with the currently registered network can ensure service continuity through the N14 interface. Accordingly, the UE may determine a subsequent operation (e.g., NG-based handover or PDU session establishment procedure).

(4) Step S1808: To register with the network, the UE transmits a Registration Request message to the NG-RAN. This step corresponds to step 1 of the registration procedure described in FIG. 6.

The Registration Request message may include UE ID information for the home SP so that the AMF of the V-SNPN can request the home SP to authenticate the UE with respect to the home SP network with which the UE can currently register from among the networks included in the Supported Home SP ID with N14 interface indication IE and/or the Supported Roaming Group ID with N14 interface indication IE.

Home SP ID and priority information may be pre-configured in the UE. In this case, the UE ID for the home SP may be selected in consideration of both information pre-configured in the UE and information received through the SIB.

(5) Step S1810: The NG-RAN selects the AMF. This step corresponds to step 2 of the registration procedure described in FIG. 6.

The NG-RAN may select the AMF based on 5G-S-TMSI and/or GUAMI. 5G-S-TMSI and/or GUAMI may be received by being included in the Registration Request message transmitted by the UE. If the 5G-S-TMSI and/or GUAMI is not included in the Registration Request message transmitted by the UE or is invalid, the NG-RAN may select the AMF based on the Requested NSSAI, etc. If it is difficult to select an appropriate AMF, the NG-RAN may select a default AMF based on information configured in the NG-RAN.

(6) Step S1812: The NG-RAN delivers the Registration Request message received from the UE to the selected AMF. This step corresponds to step 3 of the registration procedure described in FIG. 6.

(7) Step S1814: Steps 4-20 of the registration procedure described in FIGS. 6 and 7 are performed.

In this step, the AMF may select the home SP ID based on the UE ID for the home SP received from the UE. The AMF may request authentication for the UE from the AUSF and UDM belonging to the home SP and retrieve subscriber information.

The AMF may determine a mobility mode to be used when the UE moves to another network instead of and/or together with the home SP ID. The mobility mode may indicate any one of handover, N3IWF-based interworking, and LBO PDU session establishment.

When there is a PDU session currently active (i.e., an established PDU session), the AMF may determine a mobility mode for each PDU session. For example, when two PDU sessions (e.g., PDU session A and PDU session B) are active, the AMF may determine the mobility mode as N3IWF-based interworking for the PDU session A and the mobility mode as handover for the PDU session B.

The AMF may determine the mobility mode differently for each UE or for each activated PDU session of the UE according to a target network to which the UE can move. For example, the AMF may determine the mobility mode for each UE according to the target network as follows.

UE-1, PLMN-1: Xn-based or NG-based handover
UE-1, SNPN-2: N3IWF-based interworking
UE-2, PLMN-1: LBO PDU session establishment
UE-2, SNPN-2: Xn-based or NG-based handover For example, the AMF may determine the mobility mode for each activated PDU session according to the target network as follows.

UE-1, PDU Session A, PLMN-1: Xn-based or NG-based handover
UE-1, PDU Session A, SNPN-2: N3IWF-based interworking
UE-1, PDU Session B, PLMN-1: N3IWF-based interworking
UE-1, PDU session B, SNPN-2: LBO PDU session establishment The AMF may transmit information about the mobility mode determined according to the corresponding situation to the NG-RAN and/or the UE through procedures such as initial registration, mobility registration, PDU session establishment, and/or PDU session modification. For example, whether the generated PDU session is made with LBO or HR may be considered.

Alternatively, the AMF may only determine whether handover can be used when the UE or an activated PDU session is moved to another network instead of the home SP ID and/or mobility mode.

(8) Step S1816: The AMF transmits an initial context setup request message to the NG-RAN to create a UE context in the NG-RAN. This step corresponds to step 21 of the registration procedure described in FIG. 7.

The initial context setup request message may include a Registration Accept message that is a response to the Registration Request message. The initial context establishment setup message may include the selected home SP ID. The NG-RAN of the V-SNPN may perform additional operations (e.g., access control, connected mode mobility) for the home SP based on the selected home SP ID. For example, the NG-RAN of the V-SNPN may instruct the UE to measure the home SP network for connected mode mobility to the home SP.

The information transmitted to the NG-RAN may be transmitted only when an update is required for the information transmitted in step S1804. For example, an update may be required and the information may be transmitted to the NG-RAN, when, although there is an N14 interface, but the UE does not have a subscription to a specific SNPN or PLMN, so a handover to the corresponding network should not be performed.

Instead of the initial context setup request message, a DL NAS transfer message may be used.

(9) Step S1818: The NG-RAN delivers the Registration Accept message received from the AMF to the UE. This step corresponds to step 21 of the registration procedure described in FIG. 7.

Upon receiving the Registration Accept message, the UE may know whether service continuity through the N14 interface can be guaranteed with the home SP network that has established an SLA with the currently registered network.

Thereafter, steps 22-25 of the registration procedure described in FIG. 7 are performed. This step is not shown in FIG. 18.

Thereafter, when the UE moves to another network while maintaining the PDU session being serviced in the currently registered network, the following operation may be performed based on the information received in steps S1816/S1818. This step is not shown in FIG. 18.

When the UE moves to a network for which the N14 interface with the currently registered network exists and which is included in the supported network list, the NG-RAN may trigger an NG-based handover to the AMF of the source network. When requesting a handover, the NG-RAN may include a target network ID (e.g., a PLMN ID and/or a combination of a PLMN ID and an NID). Upon receiving the handover request, the AMF of the source network may request a handover together with the UE context to the AMF of the target network through the N14 interface to ensure service continuity for the UE.

When the UE moves to a network for which the N14 interface with the currently registered network does not exist, the UE may perform a PDU session establishment procedure through the N3IWF. That is, the UE may select an N3IWF of a network to which the corresponding PDU session is anchored, perform registration, establish a PDU session, and perform handover for the corresponding PDU session. In order to inform that the PDU session was existing while establishing the PDU session, the PDU Session Establishment Request message may include a request type set to "existing PDU session" and a PDU session ID to perform handover. In this process, a PDU session to be subjected to handover may be selected in consideration of the mobility mode received from the network. The PDU session establishment procedure through the N3IWF may follow the PDU session establishment procedure described in FIGS. 8 and 9 and S4.9.2 of 3GPP TS 23.502.

Examples of a situation in which a PDU establishment procedure and handover are performed through the N3IWF may refer to FIGS. 14 to 16 described above.

According to Embodiment 3 of the present disclosure described above, the network may inform the UE of whether the N14 interface is supported in advice through the SIB, and may support the UE to select a method for receiving service continuity support between the home SP and the V-SNPN according to the network configuration situation. In addition, the NG-RAN of the V-SNPN may support an additional operation in consideration of the home SP. In addition, the NG-RAN can know the network configuration in advance and quickly move the UE to the target network by performing Xn-based handover or NG-based handover to the target network.

Figure 19:
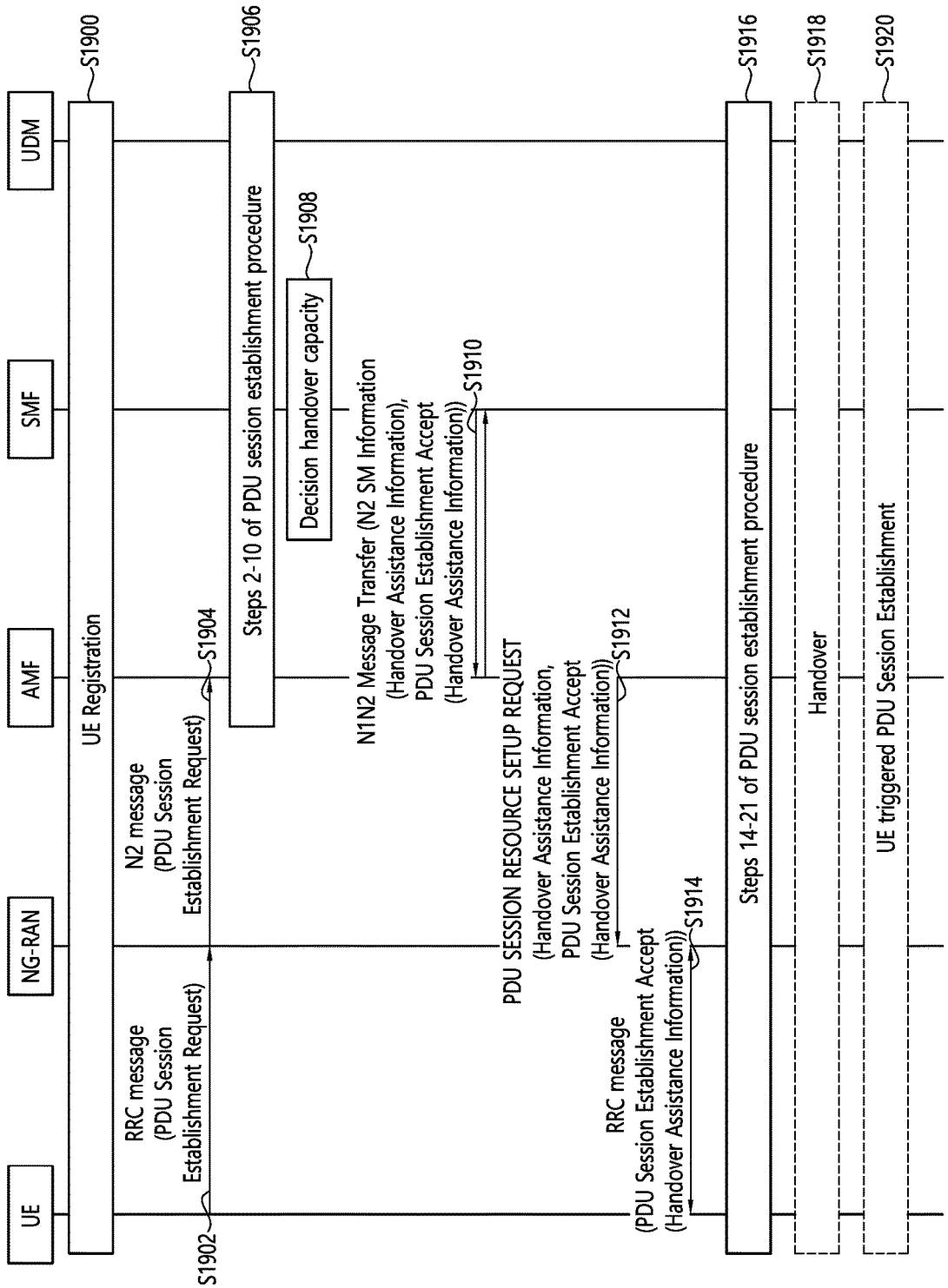
FIG. 19 shows an example of a method for informing a UE of whether handover between a PLMN and an SNPN is possible during a PDU session establishment procedure to which implementations of the present disclosure is applied.

4. Embodiment 4: Informing the UE of Mobility Mode During PDU Session Establishment Procedure FIG. 19 shows an example of a method for informing a UE of whether handover between a PLMN and an SNPN is possible during a PDU session establishment procedure to which implementations of the present disclosure is applied.

(0) Step S1900: The UE is already registered in the network according to the registration procedure described in FIGS. 6 and 7.

(1) Step S1902/S1904: The UE transmits a PDU Session Establishment Request message through RRC and N2 messages in order to receive a service from the corresponding network. This step corresponds to step 1 of the PDU session establishment procedure described in FIG. 8.

(2) Step S1906: Steps 2-10 of the PDU session establishment procedure described in FIG. 8 may be performed. This may be the case when the established PDU session is an LBO PDU session.

When the established PDU session is an HR PDU session, it may be referred to S4.3.2.2.2 of 3GPP TS 23.502.

(3) Step S1908: The SMF determines whether the PDU session can be handed over to another network using the handover procedure in 3GPP access described in S4.9.1 of 3GPP TS 23.502 based on at least one of the following information.

1) Subscriber information received from the UDM;
2) whether it is an LBO PDU session or an HR PDU session;
3) the presence or absence of N14 interface between the currently registered network and other networks;
4) If the N14 interface exists, whether an SLA has been established between the two networks;
5) when the UE performs the registration procedure described in FIGS. 11 to 13, FIG. 18 and/or FIG. 19 described above, the supported network list created in the process;
6) Information that can be received from the PCF (e.g., preference information—N3IWF-based interworking or RAN-based handover, etc.)

It is assumed that the information about whether the N14 interface exists between AMFs of the PLMN and the SNPN in which the SLA has been established is pre-configured in the AMF. In step S1906, the AMF may deliver the information to the SMF using a message such as Nsmf_PDUSession_CreateSMContext Request.

Step S1908 may be executed immediately after the SMF retrieves the subscriber information from the UDM.

Among the above-described information, 3), 4), and 5) may be provided when the AMF transmits the PDU Session Establishment Request message to the SMF.

(4) Step S1910: The SMF generates resource information to be allocated in the NG-RAN for the PDU session and a PDU Session Establishment Accept message, and delivers it to the AMF using the Namf_Communication_N1N2MessageTransfer message. This step corresponds to step 11 of the PDU session establishment procedure described in FIG. 8.

The SMF may deliver the information determined in step S1908 (i.e., whether handover is performed) to the NG-RAN and the UE in the form of Handover Assistance Information. The Handover Assistance information may include at least one of the following information.

Mobility mode: When the corresponding PDU session needs to move to another network, the mobility procedure to be used (Xn-based handover, NG-based handover, N3IWF-based interworking and/or LBO PDU session establishment procedure, etc.)

A list of networks in which the corresponding PDU session should not be delivered using the handover procedure Information about whether the PDU session is an LBO PDU session or an HR PDU session Information about the network in which the PDU session was created (e.g., PLMN ID or a combination of PLMN ID and NID)

Instead of the mobility mode, it is also possible to inform the NG-RAN and the UE of an indicator (on/off type) indicating whether the corresponding PDU session can be handed over to another network using the handover procedure in the 3GPP access.

In addition to Handover Assistance information, S-NSSAI may be used. That is, information such as which mobility mode should be used for a PDU session using a specific S-NSSAI to be delivered to another network and/or whether handover to another network (Xn-based or NG-based) is possible may be first configured in the NG-RAN (according to Operation administration maintenance (OAM) or NG setup procedure). Thereafter, in the PDU session establishment process, the NG-RAN may determine the mobility mode or whether handover is possible for the PDU session through the S-NSSAI included in the PDU Session Resource Establishment Request message. If related information is also configured in the UE, a similar operation may be possible using the S-NSSAI.

(5) Step S1912: The AMF transmits a PDU Session Resource Setup Request message including resource information for a PDU session received from the SMF in step S1910 to the NG-RAN. This step corresponds to step 12 of the PDU session establishment procedure described in FIG. 8.

The PDU Session Resource Establishment Request message includes a PDU Session Establishment Accept message to be delivered to the UE. In addition, through the Handover Assistance information included in the PDU Session Resource Setup Request message, the NG-RAN may know the mobility mode or whether handover to another network is possible for the corresponding PDU session.

(6) Step S1914: Upon accepting the resource allocation request for the PDU session, the NG-RAN determines the NG-RAN configuration (e.g., SDAP configuration, DRB configuration, etc.) for the PDU session based on the information sent by the SMF, and notifies it to the UE through an RRC reconfiguration message. This step corresponds to step 13 of the PDU session establishment procedure described in FIG. 8.

The RRC message delivered to the UE includes a PDU Session Establishment Accept message. Upon receiving the configuration information related to the corresponding PDU session from the NG-RAN, after applying this, the UE responds to the NG-RAN with an RRC reconfiguration complete message.

Through the Handover Assistance information included in the PDU Session Establishment Accept message, the UE can know may know the mobility mode or whether handover to another network is possible for the corresponding PDU session.

(7) Step S1916: Steps 14-21 of the PDU session establishment procedure described in FIG. 9 may be performed. This may be the case when the established PDU session is an LBO PDU session.

When the established PDU session is an HR PDU session, it may be referred to S4.3.2.2.2 of 3GPP TS 23.502.

(9) Step S1918/S1920: When the UE moves to another network while maintaining the PDU session being serviced in the currently registered network, the following operation may be performed based on the information received in step S1912/S1914.

Step S1918: When the mobility mode is set to Xn-based or NG-based handover in the Handover Assistance information, the NG-RAN may initiate an Xn-based or NG-based handover procedure to the NG-RAN of the target network. When an indicator indicating that the handover procedure can be used is received instead of the mobility mode, the Xn-based or NG-based handover procedure may also be initiated.

Step S1920: When the mobility mode is set to N3IWF-based interworking in the Handover Assistance information, the UE may perform a PDU session establishment procedure through the N3IWF. When an indicator indicating that the handover procedure cannot be used is received instead of the mobility mode, the UE may also perform a PDU session establishment procedure through the N3IWF. That is, the UE may select an N3IWF of a network to which the corresponding PDU session is anchored, perform registration, establish a PDU session, and perform handover for the corresponding PDU session. In order to inform that the PDU session was existing while establishing the PDU session, the PDU Session Establishment Request message may include a request type set to "existing PDU session" and a PDU session ID to perform handover. In this process, a PDU session to be subjected to handover may be selected in consideration of the mobility mode received from the network. The PDU session establishment procedure through the N3IWF may follow the PDU session establishment procedure described in FIGS. 8 and 9 and S4.9.2 of 3GPP TS 23.502.

Examples of a situation in which a PDU establishment procedure and handover are performed through the N3IWF may refer to FIGS. 14 to 16 described above.

When the mobility mode is set to LBO PDU session establishment in the Handover Assistance information, the UE may perform the PDU session establishment procedure described in FIGS. 8 and 9. When the PDU session establishment procedure through the N3IWF is attempted in step S1920 by receiving an indication that the handover procedure cannot be used instead of the mobility mode, but fails, the PDU session establishment procedure described in FIGS. 8 and 9 may be performed.

According to Embodiment 4 of the present disclosure described above, in the PDU session establishment procedure, the network may select and inform the UE of a method for supporting service continuity between the home SP and the V-SNPN. In addition, the NG-RAN can know the network configuration in advance and quickly move the UE to the target network by performing Xn-based handover or NG-based handover to the target network.

5. Embodiment 5: Notifying the UE of the Mobility Mode Using UE Configuration Update Procedure FIG. 20 shows an example of a method for informing a UE of whether handover between a PLMN and an SNPN is possible through a UE configuration update procedure after a PDU session establishment procedure to which implementations of the present disclosure is applied.

(0) Step S2000/S2002: The UE is already registered in the network according to the registration procedure described in FIGS. 6 and 7.

In addition, the UE performs the PDU session establishment procedure described in FIGS. 8 and 9 in order to receive a service from the corresponding network. This may be the case when the corresponding PDU session is an LBO PDU session. When the established PDU session is an HR PDU session, it may be referred to S4.3.2.2.2 of 3GPP TS 23.502.

(1) Step S2004: The AMF determines a network list (e.g., a supported network list) that can ensure service continuity by using a handover procedure for the UE based on at least one of the following information, and initiates the UE configuration update procedure to deliver it to the UE.

a list of PDU sessions currently used by the UE;
whether the activated PDU session is an LBO PDU session or an HR PDU session;
Subscriber information received from the UDM;
presence of N14 interface between the currently registered network and other networks;
If the N14 interface exists, whether there is an established SLA between the two networks;
When the UE performs the registration procedure described in FIGS. 11 to 13, FIG. 18 and/or FIG. 19 described above, a supported network list created in the process;
6) Information that can be received from the PCF (e.g., preference information—N3IWF-based interworking or RAN-based handover, etc.)

It is assumed that the information about whether the N14 interface exists between AMFs of the PLMN and the SNPN in which the SLA has been established is pre-configured in the AMF.

The AMF may determine a mobility mode to be used when the UE moves to another network instead of and/or together with the home SP ID. The mobility mode may indicate any one of handover, N3IWF-based interworking, and LBO PDU session establishment.

When there is a PDU session currently active (i.e., an established PDU session), the AMF may determine a mobility mode for each PDU session. For example, when two PDU sessions (e.g., PDU session A and PDU session B) are active, the AMF may determine the mobility mode as N3IWF-based interworking for the PDU session A and the mobility mode as handover for the PDU session B.

The AMF may determine the mobility mode differently according to a target network to which the UE can move. For example, the AMF may determine to use a handover procedure for PDU session A when the target network is PLMN-1, and to use N3IWF-based interworking when the target network is SNPN-2.

Alternatively, the AMF may only determine whether handover can be used when the UE or an activated PDU session is moved to another network instead of the supported network list and/or mobility mode.

(2) Step S2006: The AMF delivers the supported network list determined in step S2004 to the UE by including it in the UE configuration update command In this process, a supported network list may also be delivered to the NG-RAN.

When the mobility mode of the UE or the mobility mode for an individual PDU session is determined instead of the supported network list in step S2004, the corresponding information may be delivered to the UE and the NG-RAN.

(3) Step S2008: After updating the information received in step S2006, the UE responds to the AMF by using the UE configuration update complete message.

(4) Step S2010: Steps 2b-4 of the UE configuration update procedure disclosed in S4.2.4.2 of 3GPP TS 23.502 are performed.

Thereafter, when the UE moves to another network while maintaining the PDU session being serviced in the currently registered network, the NG-RAN and the UE may operate as follows based on the information received in step S2006. This step is not shown in FIG. 20.

When the target network is included in the supported network list and/or the mobility mode is set to Xn-based or NG-based handover, the NG-RAN may initiate an Xn-based or NG-based handover procedure to the NG-RAN of the target network. When an indicator indicating that the handover procedure can be used is received instead of the mobility mode, the Xn-based or NG-based handover procedure may also be initiated.

When the mobility mode is set to N3IWF-based interworking, the UE may perform a PDU session establishment procedure through the N3IWF. When an indicator indicating that the handover procedure cannot be used is received instead of the mobility mode, the UE may also perform a PDU session establishment procedure through the N3IWF. That is, the UE may select an N3IWF of a network to which the corresponding PDU session is anchored, perform registration, establish a PDU session, and perform handover for the corresponding PDU session. In order to inform that the PDU session was existing while establishing the PDU session, the PDU Session Establishment Request message may include a request type set to "existing PDU session" and a PDU session ID to perform handover. In this process, a PDU session to be subjected to handover may be selected in consideration of the mobility mode received from the network. The PDU session establishment procedure through the N3IWF may follow the PDU session establishment procedure described in FIGS. 8 and 9 and S4.9.2 of 3GPP TS 23.502.

Examples of a situation in which a PDU establishment procedure and handover are performed through the N3IWF may refer to FIGS. 14 to 16 described above.

When the mobility mode is set to LBO PDU session establishment, the UE may perform the PDU session establishment procedure described in FIGS. 8 and 9. When the PDU session establishment procedure through the N3IWF is attempted by receiving an indication that the handover procedure cannot be used instead of the mobility mode, but fails, the PDU session establishment procedure described in FIGS. 8 and 9 may be performed.

According to Embodiment 5 of the present disclosure described above, by using the UE configuration update procedure, the network may select and inform the UE of a method for supporting service continuity between the home SP and the V-SNPN according to the activated PDU session situation.

6. Embodiment 6: Notifying the UE of the Mobility Mode During Registration Procedure with Target Network FIG. 21 shows an example of a method in which a target network notifies a UE of whether handover between a PLMN and an SNPN is possible to which implementations of the present disclosure is applied.

In FIG. 21, it is assumed that the subscriptions that the UE can use in the source network and the target network are different. Accordingly, the UE should perform a registration procedure in the source network and the target network, respectively.

(0) Step S2100/S2102: The UE is already registered in the source network (5GC #1) according to the registration procedure described in FIGS. 6 and 7.

In addition, the UE performs the PDU session establishment procedure described in FIGS. 8 and 9 in order to receive a service from the source network. This may be the case when the corresponding PDU session is an LBO PDU session. When the established PDU session is an HR PDU session, it may be referred to S4.3.2.2.2 of 3GPP TS 23.502.

(1) Step S2104: Since the UE needs to access the target network 5GC #2 using a subscription different from the source network, the UE starts a registration procedure with the target network. The UE transmits a Registration Request message including a subscription for the target network to the NG-RAN of the target network.

The Registration Request message may include on-going serving information which includes the source network ID, the list of services currently used in the source network, the currently active (i.e., already established) PDU session information (e.g., S-NSSAI, LBO PDU session list, HR PDU session list, home network ID in case of HR PDU session), etc.

The Registration Request message may include the preferred network list described in FIGS. 11 to 13 and/or FIG. 17.

The same is applicable even when the UE registers with the target network using the same subscription as the source network.

(2) Step S2106: The NG-RAN selects the AMF.

The NG-RAN may select the AMF based on 5G-S-TMSI and/or GUAMI. 5G-S-TMSI and/or GUAMI may be received by being included in the Registration Request message transmitted by the UE. If the 5G-S-TMSI and/or GUAMI is not included in the Registration Request message transmitted by the UE or is invalid, the NG-RAN may select the AMF based on the Requested NSSAI, etc. If it is difficult to select an appropriate AMF, the NG-RAN may select a default AMF based on information configured in the NG-RAN.

(3) Step S2108: The NG-RAN delivers the Registration Request message received from the UE to the selected AMF.

(4) Step S2110: Steps 4-20 of the registration procedure described in FIGS. 6 and 7 are performed.

In the registration procedure with the target network, the UE may transmit to the target network the 5G-GUTI allocated from the source network or the SUCI, NID, etc., used in the registration procedure with the source network. If the target network can find the source network using the corresponding information, the target network may retrieve the UE context based on this, or may refer to it when determining the mobility mode for the UE based on subscriber information (e.g., information about the PDU session that has been created) obtained from the UDM. The information about the created PDU session may include the SMF address or ID responsible for the PDU session. Since the SMF address or ID contains the PLMN/SNPN ID, the target network can know in which PLMN/SNPN the PDU session was created based on this.

(5) Step S2112: If the AMF of the target network can accept the registration request of the UE, the AMF of the target network determines a mobility mode (e.g., handover, N3IWF-based interworking, LBO PDU session establishment, etc.) that the corresponding UE can use, based on the on-going serving information received from the UE, subscriber information received from the UDM, presence of N14 interface between AMF of SNPN, SLA, etc.

It is assumed that the information about whether the N14 interface exists between AMFs of the PLMN and the SNPN in which the SLA has been established is pre-configured in the AMF.

Step S2112 may be performed immediately after the AMF retrieves the subscriber information from the UDM.

When there is a PDU session currently active (i.e., an established PDU session), the AMF of the target network may determine a mobility mode for each PDU session. For example, when two PDU sessions (e.g., PDU session A and PDU session B) are active, the AMF may determine the mobility mode as N3IWF-based interworking for the PDU session A and the mobility mode as handover for the PDU session B.

Alternatively, the AMF may only determine whether handover can be used when the UE or an activated PDU session is moved to another network instead of the mobility mode.

When the Registration Request message is transmitted including the preferred network list in step S2104, the AMF of the target network may determine a supported network list that the UE can use based on the preferred network list received from the UE, subscriber information received from the UDM, the presence of N14 interface between the AMFs of the SNPN, SLA, etc. A network ID included in the supported network list may be determined in the preferred network list.

(6) Step S2114: The AMF of the target network sends a DL NAS transport message to the NG-RAN of the target network to create a UE context in the NG-RAN.

The DL NAS transport message may include a Registration Accept message. The DL NAS transport message and the Registration Accept message may include the mobility mode determined in step S2112.

An initial context setup request message may be used instead of the DL NAS transport message.

(7) Step S2116: The NG-RAN of the target network delivers the Registration Accept message received from the AMF of the target network to the UE in step S2114. Upon receiving the Registration Accept message including the mobility mode, the UE can know which mobility mode to use when moving from the source network to the target network.

Thereafter, steps 22-25 of the registration procedure described in FIG. 7 are performed. This step is not shown in FIG. 21.

Thereafter, when the UE moves to the target network while maintaining the PDU session being serviced in the source network, the following operation may be performed based on the information received in step S2116. This step is not shown in FIG. 21.

When the mobility mode is set to Xn-based or NG-based handover, the UE may inform the NG-RAN of the source network that the handover procedure can be used in a situation where the UE moves to the target network. Therefore, thereafter, the NG-RAN of the source network may initiate an Xn-based or NG-based handover to the NG-RAN of the target network. When an indicator indicating that a handover procedure can be used is received instead of the mobility mode, Xn-based or NG-based handover may be initiated.

When the mobility mode is set to N3IWF-based interworking, the UE may perform a PDU session establishment procedure through the N3IWF. When an indicator indicating that the handover procedure cannot be used is received instead of the mobility mode, the UE may also perform a PDU session establishment procedure through the N3IWF. That is, the UE may select an N3IWF of a network to which the corresponding PDU session is anchored, perform registration, establish a PDU session, and perform handover for the corresponding PDU session. In order to inform that the PDU session was existing while establishing the PDU session, the PDU Session Establishment Request message may include a request type set to "existing PDU session" and a PDU session ID to perform handover. In this process, a PDU session to be subjected to handover may be selected in consideration of the mobility mode received from the network. The PDU session establishment procedure through the N3IWF may follow the PDU session establishment procedure described in FIGS. 8 and 9 and S4.9.2 of 3GPP TS 23.502.

Examples of a situation in which a PDU establishment procedure and handover are performed through the N3IWF may refer to FIGS. 14 to 16 described above.

When the mobility mode is set to LBO PDU session establishment, the UE may perform the PDU session establishment procedure described in FIGS. 8 and 9. When the PDU session establishment procedure through the N3IWF is attempted by receiving an indication that the handover procedure cannot be used instead of the mobility mode, but fails, the PDU session establishment procedure described in FIGS. 8 and 9 may be performed.

When the UE notifies the source network that the handover procedure is available, the PDU session list in which the mobility mode is set to Xn-based or NG-based handover may be delivered together. In this case, the NG-RAN of the source network may deliver only the corresponding PDU session to the target network.

Alternatively, the UE may not deliver any information about whether the handover procedure is possible to the source network. In this case, the NG-RAN of the source network will attempt to deliver all PDU sessions to the target network, and the target network may accept only PDU sessions that are capable of handover. For the PDU session in which the handover is rejected, the UE may attempt an N3IWF-based interworking or LBO PDU session establishment procedure based on the mobility mode.

The UE may not include the preferred network list in the Registration Request message. Instead, the AMF that has received the Registration Request message from the UE may receive information (e.g., network ID) about the SNPN that has established an SLA with the PLMN from the UDM, and determine a preferred network list in step S2112. Alternatively, only information about a network with which the UE can register may be stored in the UDM, and information about a network with which an SLA has been established may be configured in the AMF. In this case, the AMF may consider whether an SLA has been established when determining a supported network list.

According to Embodiment 5 of the present disclosure described above, in the process of registering the UE with the target network, the AMF of the target network may select and notify a method for supporting service continuity with the source network.

According to Embodiment 1 of the present disclosure described above, it is as follows.

During mobility scenarios, the target network may inform the UE of a mobility indication to instruct the UE to handover the HR PDU session using Existing PDU Session indication during registration.

During mobility scenario from home SP to SNPN #1, the target network may inform the UE of a mobility indication to instruct the UE how to handover the LBO PDU Session anchored at home SP (i.e., non-roaming PDU session) during registration with the target network.

This mobility indication is made based on the interworking situations between the source network and the target network (e.g., roaming-like interworking or N3IWF-based interworking or no interworking support). According to the mobility indication, the UE may perform the handover of the LBO PDU session using Existing PDU Session indication or Initial Request indication to the target network.

Alternatively, the source network may provide the mobility indication during the registration procedure. The UE may select SNPN supporting PDU session handover if the UE selects target SNPN based on manual selection. The UE may also use the information in the target network to perform handover of LBO PDU session using Existing PDU Session indication or Initial Request indication.

If mobility indication is not received, the UE may perform the handover of the LBO PDU session in the following order:

Procedure with Existing PDU Session indication;
Procedure with Initial Request indication;

Each of the embodiments described above with reference to the drawings in the present disclosure may be performed individually, or some features of each embodiment may be performed in combination with each other.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
    registering with a source Stand-alone Non-Public Network (SNPN) through a Next Generation Radio Access network (NG-RAN) node of the source SNPN;
    establishing a Protocol Data Unit (PDU) session with the source SNPN through the NG-RAN node of the source SNPN;
    transmitting a Registration Request message to an Access and Mobility Management Function (AMF) of a target SNPN through a NG-RAN node of the target SNPN,
    wherein the Registration Request message includes a 5G Globally Unique Temporary Identifier (5G-GUTI) assigned by the source SNPN, and
    wherein the Registration Request message further includes a Network ID (NID) of the source SNPN based on i) a UE registering with the target SNPN, and ii) the 5G-GUTI being assigned by the source SNPN; and
    receiving a Registration Accept message from the AMF of the target SNPN through the NG-RAN node of the target SNPN in response to the Registration Request message.

2. The method of claim 1, wherein the Registration Request message further includes at least one of a service list currently used in the source SNPN and/or information about established PDU sessions.

3. The method of claim 1, wherein the UE communicates with at least one of a mobile device, a network and/or an autonomous vehicle other than the UE.

4. A User Equipment (UE) comprising:
    at least one transceiver;
    at least one processor; and
    at least one memory operably connectable to the at least one processor and storing instructions that, based on being executed by the at least one processor, perform operations comprising:
    registering with a source Stand-alone Non-Public Network (SNPN) through a Next Generation Radio Access network (NG-RAN) node of the source SNPN;
    establishing a Protocol Data Unit (PDU) session with the source SNPN through the NG-RAN node of the source SNPN;
    transmitting a Registration Request message to an Access and Mobility Management Function (AMF) of a target SNPN through a NG-RAN node of the target SNPN,
    wherein the Registration Request message includes a 5G Globally Unique Temporary Identifier (5G-GUTI) assigned by the source SNPN, and
    wherein the Registration Request message further includes a Network ID (NID) of the source SNPN based on i) the UE registering with the target SNPN, and ii) the 5G-GUTI being assigned by the source SNPN; and
    receiving a Registration Accept message from the AMF of the target SNPN through the NG-RAN node of the target SNPN in response to the Registration Request message.

5. A method comprising:
    receiving, by an Access and mobility Management Function (AMF) of a target Stand-alone Non-Public Network (SNPN), a Registration Request message from a User Equipment (UE) through a Next Generation Radio Access network (NG-RAN) node of the target SNPN,
    wherein the Registration Request message includes a 5G Globally Unique Temporary Identifier (5G-GUTI) assigned by a source SNPN, and
    wherein the Registration Request message further includes a Network ID (NID) of the source SNPN based on i) the UE registering with the target SNPN, and ii) the 5G-GUTI being assigned by the source SNPN;
    determining the source SNPN based on i) the 5G-GUTI assigned by the source SNPN, and ii) the NID of the source SNPN;
    invoking a UE Context Transfer service operation on the source SNPN including a complete registration request Non-Access Stratum (NAS) message to request a Subscriber Permanent Identifier (SUPI) of the UE and a UE context;
    receiving the SUPI of the UE and the UE context from the source SNPN; and
    transmitting a Registration Accept message to the UE through the NG-RAN node of the target SNPN in response to the Registration Request message.

* * * * *